MAGNETIC SUSPENSION

Filed June 8, 1953 11 Sheets-Sheet 1

INVENTORS
JAMES W. MILLIGAN AND
STANLEY S. GREEN
BY Louis Robertson
ATTORNEY

Jan. 20, 1959 J. W. MILLIGAN ET AL 2,869,935

MAGNETIC SUSPENSION

Filed June 8, 1953 11 Sheets-Sheet 2

Jan. 20, 1959 J. W. MILLIGAN ET AL 2,869,935

MAGNETIC SUSPENSION

Filed June 8, 1953 11 Sheets-Sheet 5

LAMINATED AND SLOTTED RADIAL POLE STRUCTURE FOR SECURING MAGNETIC UNIFORMITY

Jan. 20, 1959 J. W. MILLIGAN ET AL 2,869,935

MAGNETIC SUSPENSION

Filed June 8, 1953 11 Sheets-Sheet 9

Jan. 20, 1959 J. W. MILLIGAN ET AL 2,869,935

MAGNETIC SUSPENSION

Filed June 8, 1953 11 Sheets-Sheet 10

MAGNETIC SUSPENSION

Filed June 8, 1953

SCHEMATIC SHOWING OF SATURATED SECTIONS WITH RESPECT TO FIELD FORM

United States Patent Office 2,869,935

Patented Jan. 20, 1959

2,869,935

MAGNETIC SUSPENSION

James W. Milligan, West Lafayette, and Stanley S. Green, Indianapolis, Ind., assignors, by mesne assignments, to Duncan Electric Company, Inc., a corporation of Indiana Application June 8, 1953, Serial No. 359,990

22 Claims. (Cl. 308—10)

This invention relates to the ancient problem of magnetic suspension. In the case of a body suspended for the purpose of rotation, the magnetic support can be arranged to provide stability in either the axial direction or in the radial direction (centering). Stable magnetic support in both the axial and radial directions would, of course, be total magnetic suspension. One aspect of the invention consists in discovering the quantitative relations which exist between the magnitudes of the axial and radial forces. For a preferred form of structure, optimum working ranges are derived in terms of key dimensions. It is shown that over a small range, total magnetic stability, namely stable support in both radial and axial directions at the same time, is very closely approached or may even be attained.

Some past suspension schemes have contemplated the use of the repulsion force of two similar poles. This has weakened and scattered the magnetic flux instead of concentrating it, with resulting loss in effectiveness. The support provided by the present solution is obtained by the use of magnetic attraction so that flux is not scattered but concentrated. In some preferred forms of the invention this concentration may be carried to the maximum or saturation value that iron poles forming the supporting gaps will carry. In other preferred forms concentration is aided by permanent magnets supplementing the main magnetic force. Thus the optimum force from a given flux is obtained, and the restoring forces in the event of displacement are both dependable and relatively strong.

Only one magnet need be used in the form of the present invention using saturation and this magnet does not have to be on the supported member. Therefore the supported member can have minimum weight of magnetic material (such as soft iron) and will provide a wide margin of weight-carrying ability over and above this for the support of any parts which may be attached to the supported member.

Embodiments of the invention are not limited as to size; the magnetic forces producing the support can be only a few grams or several pounds. Applications are too numerous and variable to be enumerated or predicted. In the bearing field magnetic suspension can be used in cases where it is desired to eliminate oil or wear, or reduce or substantially eliminate friction, or variations in friction.

Because cross-references to different parts of the description is believed very helpful in the complex discussion which follows, headings are provided. For convenience, these headings are here listed:

A. Designation of Figures
B. Structure of a Typical Device
C. General Operation
D. Constant Flux, Concentrated Near Poles
E. Further Structural Features
F. Peripheral Flux Migration and Its Prevention
G. Peripheral Pole Length H. Magnetic Circuit Modifications
I. Typical Performance Curves
J. Magnetic Width of Pole
L. Basic Tables to Afford a General Quantitative Approach
  LA. Rate of Change of Magnetic Force
  LB. The Pole Section
  LC. Flux Plotting
  LD. Tables of Force Functions Derived From Work of Flux Plotting
M. Force and Stability Calculations Using Basic Tables
  MA. Gap Constant
  MB. Force Generated Laterally by Pole Displacement
  MC. Determination of Centering Force Caused by Axial Gap
  MD. Determination of Decentering Force Caused by Radial Gap
  ME. Force Equations
  MF. Net Stabilizing Forces
N. Effect on Permeance and Force of the Field-Form Width of the Constant Flux
O. Location of the Saturated Sections
P. Discussion of the Performance Results
Q. Secondary Effects
S. Test Results.

A. DESIGNATION OF FIGURES

Although the law requires a full and exact description of at least one form of the invention, such as that which follows, it is, of course, one purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

B. STRUCTURE OF A TYPICAL DEVICE

Figure 1:
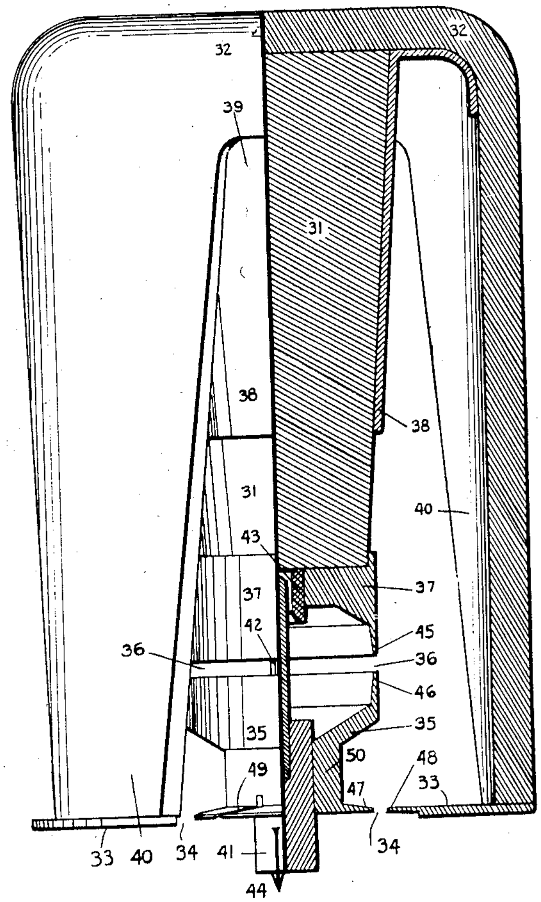
Fig. 1 is a side view of the form of the invention chosen for illustration, partly broken away to show a vertical section on a diametric plane. (See headings B to G.)

The fundamentals underlying the operation of the invention are best explained by a description of a single form of magnetic rotatable bearing shown in Fig. 1. It is a front view with a quarter-section cut away to a cross-section to show the relation of the parts in a plane passing through the axis of rotation.

In this model the magnetomotive force (M. M. F.) is provided by cylinder or bar 31, shown tapered, of Alnico V or other suitable permanent magnet material.[1] It is mounted in a soft iron shell 32 which forms a principal part of the magnetic circuit. The lower end of the shell has a soft iron circular washer 33. An annular air gap 34 is formed by the inner edge of the washer and a soft iron rotor 35. It is this rotor which is positioned magnetically in both axial and radial directions. The rotor also forms another annular air gap 36 between its top and a soft iron cap 37 which is fastened against the lower or closer end of the permanent magnet.

Although no limitation of mounting is necessary, assume, for the purpose of describing the flux path, that the bearing of Fig. 1 is mounted with its axis of rotation in a vertical position. Starting from the center of the Alnico cylinder 31, the flux moves upward in an axial direction to outer shell 32, thence radially outward and then axially downward to washer 33. It passes radially inward through the washer and through annular gap 34 to rotor 35. In the rotor it first passes radially inward and then axially upward to gap 36. Through this gap and through iron cap 37, it passes axially upward into and through the Alnico to the starting point.

Gap 34 is called the radial gap because flux passes through it in a radial direction. Gap 36 is called the axial gap because flux passes through it in an axial direction.

C. GENERAL OPERATION

The axial poles 45 and 46 acting through the axial gap 36 exert a pulling force which tends to close up the gap 36. For convenience of expression the axial pull in this gap may sometimes be called the "pull" force. The annular radial poles 47 and 48 exert a force which cancels out when taken as a whole around the complete circumference of the gap if the rotor is centered, but which exerts an axial restoring or countering force in case of any movement of the rotor from the neutral position which would make the axial gap get shorter.

The axial gap not only produces a pull but it produces a strong centering force whenever the two annular poles 45 and 46 become misaligned.

The radial gap produces a decentering effect if the rotor is moved radially from the neutral position to where pole faces 47 and 48 are not exactly concentric. If radial stability is to be obtained, the centering force must increase faster than the decentering force when the rotor is moved away from a central position.

If axial stability is to be obtained the countering force must increase faster than the pull force when the rotor is moved in such a direction as to close the axial gap 36.

By making the influence of one or the other of the gaps predominate, a choice between these effects can be made so as to secure either a high axial stability or a high radial stability. With the forms of the invention here preferred, the resulting instability in the other direction need not be severe. If an attempt is made to secure stability in both directions simultaneously by having the influence of the radial and axial gaps equal, the quantitative laws which will be derived show that this can probably be done (leaving out the adverse influence of secondary effects) but that the resultant degree of stability will be very small.

For convenience of illustration and simplicity of description, the scale proportions of Fig. 1 as well as the quantitative information on its structure have been given for the case where this slight theoretical complete magnetic stability will occur. This point is with the radial and axial gap constants the same and the gap lengths being equal to approximately six times the pole face width.

D. CONSTANT FLUX, CONCENTRATED NEAR POLES

An important part of the structure of Fig. 1 by which complete magnetic suspension is approached is in having substantially constant flux across the gaps 34 and 36, and preferably in the all-important central or concentrated part of the entire field of the gaps. Exact constancy as the gap changes may be unattainable. Even exact overall constancy for the entire field would not be as effective as maintaining almost constant that part of the flux which exerts nearly all of the force. Most force is exerted by the flux at and near the pole tips where the gap flux is most dense.

According to the present invention, this selected near-uniformity is accomplished with the aid of carefully planned magnetic saturation of each of the poles forming the gaps 34 and 36. In each pole the saturation extends from close to the gap face, away from this face a substantial distance. In the illustrated form this saturated section extends to the point where at its root the tapered section of each such pole suddenly gets larger. Such saturation is obtained by supplying the proper amount of M. M. F. for the poles in question when used with the gaps 34 and 36, and in proper cross-sectional design of the poles. A full and detailed explanation of the saturation, why it is needed, how far back from the pole face it should extend, and how it is obtained will be given later.

The substantially constant centralized flux required is obtained by having a length of saturated path in each pole of gaps 34 and 36 extending as close as possible to the pole tip.

Figure 7:
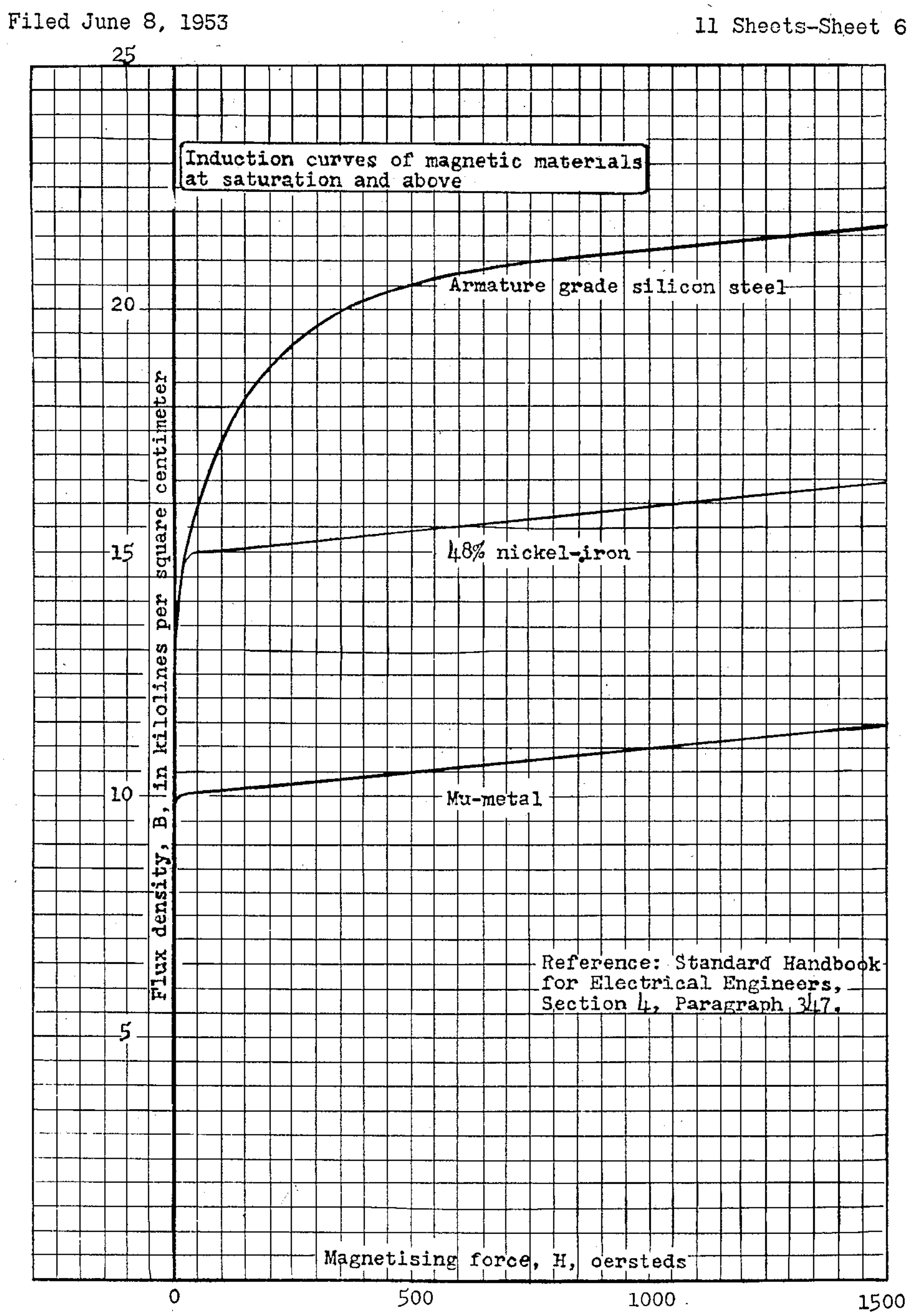
Fig. 7 is a diagram showing induction curves for three different metals. (See heading D.)

Refer to Fig. 7 showing the induction curves of three common magnetic materials throughout a range including saturation and above. The top curve is for armature grade silicon steel, the middle curve for 48% nickel steel and the bottom curve is for Mu-metal. These curves are carried to a point far above saturation and it is to be noted that after saturation is reached, the slope of all three curves becomes the same—namely, the slope of the induction curve of air which is a straight line. The maximum intrinsic inductions[2] of the three materials vary, with that for the iron being highest; the nickel steel being next and the Mu-metal the lowest.

Inspecting these curves, it appears that a length of

[1] Permanent Magnet Manual No. 4, Indiana Steel Products Co., Chicago, Ill., page 19.

[2] Standard Handbook for Electrical Engineers, Sec. 4, paragraph 347, Fig. 35.

these metals leading up to the poles can be made to act as a valve to hold the flux constant (save for the small effect of the slope above saturation). To keep this effect small, the length of saturation should be several times the length across the gap.

Viewed another way, or as sources of variable M. M. F., the saturated sections provide approximately just the amount of M. M. F. variation needed to hold the flux constant (at the zone where most of the force is produced) in spite of the change of permeance as the gap is varied. In Table III, true constancy of flux has been assumed, first because it is a uniform standardized reference condition, and secondly, because it can be substantially reached, for practical purposes, with the magnetic materials of Fig. 7.

Computation of the departure of the flux from true constancy is an engineering detail, the methods of which are well understood so that for brevity only a summary of the general results need be given:

(1) For an initial gap of say, .025", the saturated sections must consume or valve-down 25 percent of the total available M. M. F. in the iron in order to allow the gap to be opened up to .040" without the flux decreasing by as much as 2.7 percent. This is with the nickel steel. By "paying" for it with as much as 40 percent of the total available M. M. F. absorbed in the saturated section, the flux decrease can be held to 1.3 percent. This is, indeed, very close to constancy, and also over a very generous range of motion.

(2) The magnetic material must be worked well above the saturation point so that it does not fall below this when the gap is in its greatest expected operating position. From the curves of Fig. 7 it can be seen that a material which saturates quickly (i. e., with a low magnetizing force) and at as high an intrinsic flux value as possible is the most desirable. Although all the materials shown could be used, the nickel steels represented by Mu metal is most desirable interms of taking less of the total M. M. F. in the saturated section to provide a given degree of flux constancy. The silicon steel would be best of all were it not for the fact that it saturates at too great an expenditure of M. M. F. For special or design reasons, however, it might be desirable to use any one, or a combination of the three materials in a given device. Table XII in somewhat more complete form gives the performance to be expected from the saturated sections.

E. FURTHER STRUCTURAL FEATURES

Magnet 31 is tightly covered with a copper sleeve 38 which holds it in place within the iron shell. It is well known that a coating of high-conductivity metal tends to protect a permanent magnet from changes in strength caused by magnetic disturbances to which it may be subjected in service, hence the construction shown. Both the sleeve 38 and the washer 33 may be spot-welded to the shell. Iron cap 37 may be a force fit over the lower end of magnet 31.

The shell has three large inverted V-shaped notches 39 in its cylindrical wall. As Fig. 1 is drawn, one of these is bisected by the center line of the drawing which in turn coincides with the rotational axis of the bearing. This divides the shell wall into three tapered legs 40. The decreasing width of these legs as the small end of the Alnico magnet is approached decreases the permeance of the path for the leakage flux which does not reach the rotor but which, instead, jumps from the outside of the magnet to the inside of the shell. The cylindrical shell at the top of the tapered legs 40 is capable of carrying the entire magnet flux which consists of the useful rotor flux and all of the leakage flux. Tapering the Alnico bar also increases the effectiveness of the magnetic circuit. The tapering is not essential but is good practice, the principle being well known in the permanent magnet art.

The principal function of the Alnico magnet and its shell is to provide M. M. F., and, as a result, deliver flux to the rotor. Their design may take a limitless number of dimensions and shapes depending on magnetic materials available, space requirements and the amount of M. M. F. to be delivered at the rotor.

In one form of the invention, to which a companion application especially relates, all four poles are formed by inserts of permanent magnetic material.

Into the rotor by a forced fit is fastened aluminum shaft 41. In the top of this shaft is fixed steel pivot 42. This pivot extends upward to a limit-bushing 43 which may be of bronze or graphite. The hole in the bushing is .020" larger on the diameter than the pivot. The result of this is that when the rotor is centered, the pivot is not touching the limit-bushing, and a radial movement of .010" in any direction would be required to make it touch. Shaft 41 is the main load-bearing axis of the device. An arrow 44 pointing downward has been drawn to represent an extension reaching as far as is necessary to accommodate any object which it is desired to mount on the shaft. On the extended end of this shaft can be mounted another and similar magnetic bearing. The position of this additional bearing and the length of the shaft 41 connecting them is such that when both bearings are in their normal and unloaded positions, the end of the steel pivot 42 on each fails to reach the hard smooth surface of the Alnico magnet by .010". It is therefore obvious that there may be this amount of displacement of the system either up or down in order to get limiting action by the pivot in an axial direction.

The .010" play has been chosen arbitrarily but is a range of movement through which magnetic stability is practical and attainable for either the radial direction or the axial direction, depending on which is chosen, without great instability in the other direction. It is obvious that play in both directions (as the drawing of Fig. 1 shows) would not be needed or desirable unless total flotation were in fact attained.

Unlike oil-lubricated bearings, magnetic devices must actually suffer a slight displacement from the neutral position for restoring forces to be generated. They are not rigid but soft and yielding. Rotors may be subject to vibration of some amplitude and it may be necessary when this occurs in an objectionable degree to plate the rectangular poles with copper in order to damp out the motion. The poles vibrating, of course, would cause some flux change through the copper and this would absorb energy in a well-known manner, to bring the poles to rest.

In many applications, no softness of the bearing can be tolerated and the magnetic suspension alone cannot be used. In other applications, this objection to softness can be overcome merely by making the limit pin and bushing (illustrated in a general way in Fig. 1) somewhat tighter so as to restrict the amount of softness before actual solid contact comes into play, using magnetic suspension at least part of the time.

Iron cap 37 is shaped to provide an annular pole 45. The width of the flat face of the pole at the axial gap is .005". By this is meant the width across the face along any radius, not the diameter across the annulus. The sides of the pole recede from the gap steeply, with a slight taper. The length of the axial gap (the spacing of the axial poles with the parts in the position shown) is .030". The upper part of the rotor is shaped to provide a matching annular pole 46 which also has a flat face width at the gap equal to .005".

Rotor 35 on its bottom edge is shaped to provide an annular radial pole 47. The width of the flat face of this pole at the radial gap and in a direction parallel to the axis is .005" and the sides of the pole recede steeply from the gap in a slight taper. The length of the radial gap (pole separation) is .030″. The inner edge of washer 33 is shaped to provide a matching annular pole 48 which also has a face flat in the axial direction, of .005″ width. The centered position of the rotor, in which the faces of both the radial pole-pairs and the axial pole-pairs are aligned, is conveniently called the neutral position. The peripheral length of each pole face, axial as well as radial, is approximately 3 cm.

Rotor 35 has one additional feature which is pointed out now but the necessity for which will be discussed in detail later. This feature is four equi-spaced radial slots dividing the radial annular pole 47 into four equal sections. One of these slots is shown at 49.

The flux path in the rotor between the axial and radial poles includes cylindrical section 50.

Although a single unit as shown in Fig. 1 would not operate in isolation, it is to be understood that the twisting couples which would then be deleterious may be overcome either by another more or less similar unit, or by a weight hanging at the far end of vertical shaft 41, only one end of which has been shown in Fig. 1.

Figure 2A:
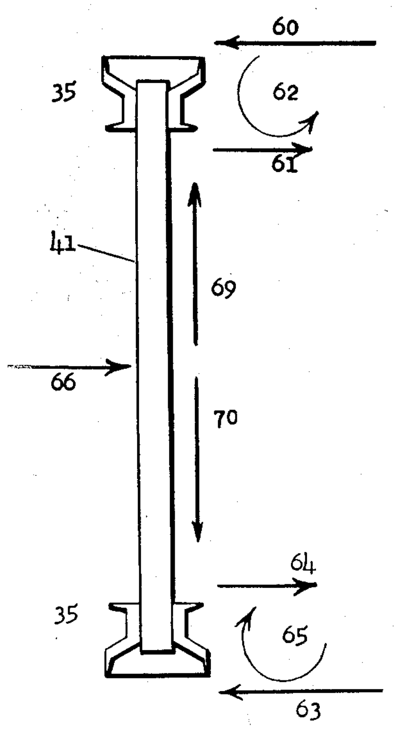
Figs. 2A and 2B are illustrations of couples which are produced magnetically upon application of various forces. (See heading E, 13th paragraph.)
Figure 2B:
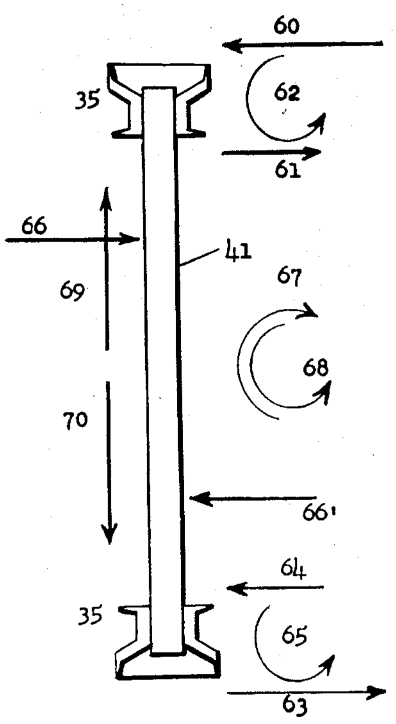

Fig. 2(*a*) and Fig. 2(*b*) show a complete shaft supported at each end by rotors 35. It is schematic for the purpose of detailing all forces to show that magnetic couples will not add in a manner adverse to the operation. Only the suspended system consisting of the shaft 41 and the rotors is included.

The axial gap of the upper rotor pulls upward very strongly with a force 69. The lower rotor pulls downward with a force 70. Adjustment is made so that in the neutral or balanced position, the difference between force 69 and force 70 equals the weight to be carried by the shaft (assuming that operation is in a vertical position). Forces 69 and 70 are usually much greater than the weight to be carried by the shaft or other unbalancing forces to be withstood by the magnetically supported system, though force 70 may be deemed to include the weight. Since forces 69 and 70 are made to cancel out, performance of the supported member depends on the change in the relative size of these and other forces as the rotor is moved away from the neutral position.

Fig. 2(*a*) shows what happens when the supported element is moved sideways (in a radial direction) by a force 66. A sufficient radial displacement of each rotor will occur to generate centering forces 60 and 63. At the same time decentering forces 61 and 64 are generated but in normal operation, these are smaller than 60 and 63. The sum of 60 and 63 minus 61 and 64 will therefore be equal and opposite to displacing force 66. Since 60 and 61 as well as 63 and 64 are in opposite directions and not in the same line of action, they give rise to two couples, represented by 62 and 65. For the conditions of Fig. 1, these are equal and opposite and cancel in their effects on the supported element. These couples are small compared with other effects on the rotor because the lines of action between the forces 60 and 61 and 63 and 64 are so close together compared with the total over-all length between rotors. Indeed, there would be no couples at all, if the design were modified to make the couple-producing forces act in the same line. Although it would be possible to do this, it would ordinarily not be worth the trouble in view of the harmless way in which the couples act.

Fig. 2(*b*) shows what happens when the supported element is subjected to two forces 66 and 66′ equal and opposite and applied out of line so as to result in a couple which can be represented by 67. A twisting movement of the supported element results, sufficient in amount to produce forces 60 and 63. These, after the deduction of forces 61 and 64, produce a couple which tends to be equal and opposite to couple 67. In the diagram it is represented by 68. The secondary couples 62 and 65, in this case, take up a direction such as to help with the neutralization of the main causative couple 67.

It is evident that all disturbing forces which can be applied to the supported member can be nothing but combinations of the two cases (*a*) and (*b*). Analysis for the two cases constitutes analysis for all in the radial direction.

F. PERIPHERAL FLUX MIGRATION AND ITS PREVENTION

Effectiveness in producing stability in the radial direction depends on holding down the decentering force caused by the occurrence of eccentricity of the two annular radial poles.

Figure 11:
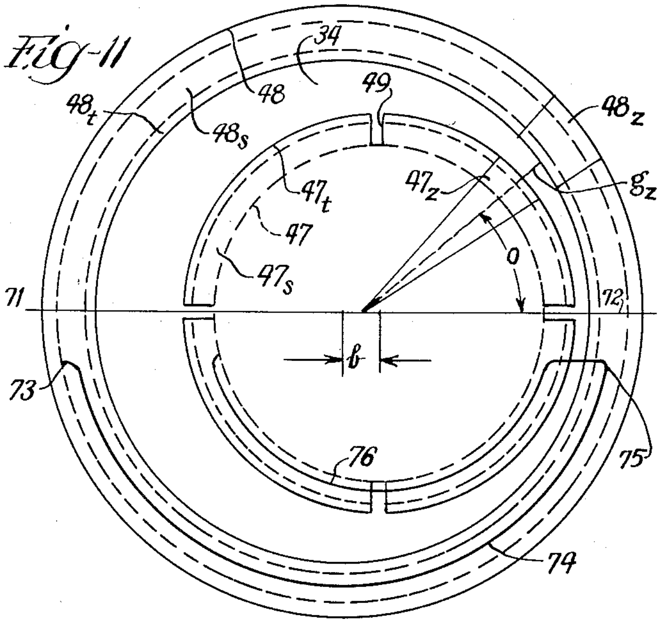
Fig. 11 is a diagram for deriving the decentering force between inner and outer annular poles. (See heading MD.)

If the contemplated stability is to be attained, the flux must not be allowed to travel or migrate around the periphery of poles 47 and 48 from the region where the gap is longest (when the pole 47 is displaced) to the spot where the gap is shortest. Such a tufting or bunching of the flux would greatly increase the eccentric force. Each peripheral section of the radial poles must be made to use its own gap exclusively. Such a flux migration can and will exist unless prevented. An extreme example of such an undesirable path is shown in Fig. 11. Flux from the pole 48 starts at the region 73 opposite the point where the zonal gap is longest and might find it easier to run all around the high permeability iron in a semi-circular path 74 until it reaches a point 75 near the region of the shortest gap where it crosses. From here it runs all the way back through the semi-circular path 76 to a point 77 which is opposite the starting region 73. This is not to say that such a long and circuitous route will be taken by all flux but is an extreme case which is to be thought of as applying to one flux line. It illustrates that the danger is there.

If complete and unrestricted migration of the flux occurred, the value of the decentering action of gap 34 would be much higher. It is essential to optimum results to cut down the very undesirable decentering force by doing everything possible to make the radial poles and gap operate as nearly as possible to the constant flux concept.

To do this it must be recognized that there are two separate migratory paths for the flux:

(*a*) A path through the saturated band $47_s$ and $48_s$.

(*b*) A path through an unsaturated peripheral pole tip portion $47_t$ and $48_t$.

In case (*a*), the greater the degree of saturation and the greater the length of the saturated section, both peripherally and rearwardly from the pole face, the less are the bad effects from this source. Even nearly saturated iron, however, may have a permeability ten times that of air, making it worth while for the flux to migrate in some degree. Additional preventive action is needed for the very best results.

The pole tip zone of case (*b*) exists for nearly all practical conditions. The density in the iron, because of the flux fringing, increases rapidly from the pole tip skin surface in a radial direction away from the gap but unless the M. M. F. across the gap is very high indeed, there will be a narrow unsaturated ring of iron at the tip surface which has a very high permeability. (Iron at moderate flux densities may have a permeability several hundred times that of air.) Under these conditions the unsaturated skin would not have to be more than a few thousandths of an inch thick to allow very damaging flux migration.

The combination of cases (*a*) and (*b*) and failure to realize the importance of flux migration can quite largely destroy the merits of any particular structure. The migration can be prevented in two ways:

(1) A high peripheral gap length and saturated path length should be used. This is a non-objectionable measure in that it has no bad effect such as producing non-uniformity in the magnetic paths giving rise to locking.

(2) Radial slotting of one or both poles. In the bearing of Fig. 1, one slot 49 of four has been shown in the rotor 35. In Fig. 11 four slots 49 having been shown in the rotor but none in the stationary pole 48. The slotting nearly eliminates migration of both case (*a*) and case (*b*). It has the very undesirable side-effect, if used in both poles for maximum effectiveness, of producing magnetic locking. This is not friction but a tendency of the bearing to stick in one place of minimum reluctance because of an alignment of rotor slots with stator slots. If the slots are omitted from either the rotor or the stator, such locking cannot occur, but the effectiveness is reduced to about one half.

Figure 17:
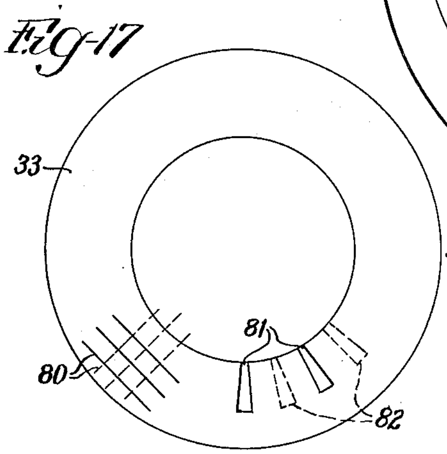
Fig. 17 is a diagrammatic representation of a modified pole structure in which successive laminations have the grain structures at different angles and slots staggered with respect to the slots of other laminations. (See heading F.)

In cases where high migration protection and a minimum of magnetic locking is required, staggered slots may be used in one pole. For example, Fig. 17 shows in plan view a laminated pole structure. Here, 81 represents slots in the top lamination and 82 (in dotted lines) the companion slots in the bottom lamination. There should be a thin spacer such as a coat of varnish or a sheet of paper between laminations to furnish some reluctance to keep one lamination from magnetically short-circuiting the slots in the other. Fig. 17 represents the structure of a member which might replace washer 33 forming one pole of the radial gap in Fig. 1. The laminated structure can be used on only one pole of a pole pair. It is usually more convenient to use this structure on the stationary pole 48.

Since in Fig. 17 a spacing of slots is indicated which would provide twenty-four effective slots, which is an even number, it would be advisable, if rotor slots are also used, to use five rotor slots, which does not divide into twenty-four evenly. This still further increases uniformity.

The slots can have both sides cut radially, thus being triangular, so as to provide a uniform cross-section for the flux as it passes radially through the iron. The number of slots per lamination can be made as large as requirements dictate; also the number of laminations can be increased.

Peripheral migration through the unsaturated pole tip can be prevented by keeping these unsaturated portions very small and knurling the edge or face of the poles. In fact, this may in some designs provide enough migration protection without slots, and without laminations.

If laminations are used, any minute tendency toward locking by anisotropic effects such as result from grain structure may be substantially eliminated by crossing the grain direction of the laminations. Thus in Fig. 17, lines 80 indicate the direction of the grain structure in the upper lamination magnetic material which is caused by the rolling and processing of the sheet. Somewhat greater flux-carrying capacity sometimes exists with the grain than across the grain. With slots or like grain structure in the opposite pole, this could tend slightly to cause locking. Such tendency is largely eliminated by positioning the lower lamination with its grain direction as shown by the dotted lines 80.

The laminated structure need not be used unless great uniformity (and absence of locking) is required, in which case it also may be desirable to use it on one of the poles of the axial pair as well (because of the grain structure difficulty in each pole). The laminated structure is also not necessary if a pole member can be fabricated in such a way as to be magnetically isotropic, as, for example, with powdered iron.

Careful calculations (step integration based on Fig. 10) for centering force have been performed for the axial gap 36 to determine the centering force produced by lateral displacement, both assuming constant flux (and therefore no peripheral flux migration) and, separately, assuming constant M. M. F. (with such migration complete and unrestricted). The integrations indicate that migration in the poles of this gap is less harmful than in the radial gap.

It is therefore not necessary to use slotting on either of the axial poles although it may sometimes be necessary to guard against slight magnetic locking due to anisotropic effects. Making one of the poles of a uniform magnetic material or laminated for cross-graining will eliminate this.

G. PERIPHERAL POLE LENGTH

It is easy to see that the centering effectiveness upon lateral displacement depends upon having a narrow pole, which means that for a given permeance and gap width it must be long as compared to its width. The question is, what should the ratio be?

The field-form zone width within which about 75 percent of the permeance falls (see Fig. 12), indicates strongly the diameter below which it is dangerous to decrease the pole circle without the field form of the pole portion of one part of the circle being excessively added to by its counterpart across the diameter. This effect, which is a rounding off or blunting, of the peaked contours of the permeance field-form will be called circular field-form aberration. It is more marked for the longer gaps and it works to produce a sharp reducing effect on the centering force. It is a secondary effect in that its value has not been provided for in the calculations. To keep it at a low value, a pole circle diameter of at least .280 cm. is desirable, and a diameter still larger is preferred. This, however, is contemplating even smaller gap lengths than are here planned, although not such extremely small gap lengths as might be found in watches, for example. With a gap length of .030″, a pole circle diameter of at least approximately 5 millimeters is preferred. For purpose of generalization, it may be stated that no pole portion within one average gap length rearwardly of a pole face portion should be less than three times as far from a laterally-spaced attraction pole portion as from the pole portion directly opposite said pole face portion; and five or ten times as far is preferred. Expressed differently, it is at present preferred that the internal diameter of the annular pole be at least 7 times the average gap length, preferably at least 11½ times. In Fig. 1, the diameter is approximately 12 times the average gap length.

These minimums have been derived from a consideration of circular field-form aberration on the axial gap. The deleterious effects for the radial gap are not as great, but these minimums apply there, too, because it is desirable to have it similar to the axial gap. Furthermore, a large diameter there is desirable for flux migration prevention, as described under heading F.

It is not necessary to confine pole structure to single annular rings. Multiple annular rings, concentric in the case of the axial poles and side-by-side (axially spaced) in the case of the radial poles, could be used. In this case a minimum distance between pole circles should be maintained to avoid excessive field-form aberration by adjacency and this distance should be at least sixteen times the pole face width, preferably twenty-two or more.

H. MAGNETIC CIRCUIT MODIFICATIONS

The magnetic circuit of Fig. 1 has been used because it is the simplest one that can be devised. It is true that the same flux passes through the axial and then the radial gap, but the fact that this is so does not affect in the slightest the validity of the calculations. As far as the forces generated by each gap are concerned they could be miles apart, or energized by separate magnets. If the gap constant of the radial gap need be changed with respect to the axial gap in order to augment the merit factor in one direction, it can be done by varying either gap diameter or pole width or both, and this without departing from the simple magnetic circuit shown in Fig. 1.

This is not to say that there could not be other types of magnetic circuits. These could take limitless forms but in all such cases the fundamental formulas would still apply. One magnetic arrangement which readily comes to mind would be that in which a separate magnet would be used for the axial gap and the radial gap. Also, it would be quite possible to have a set of concentric axial gaps acting in conjunction with a set of parallel and adjacent radial gaps.

The fact that total suspension may be wanted in some instances should not obscure the fact that the structure of the invention is more practically useful when its properties are directed for high stability of either the axial or the radial support, leaving the support in the other direction actually negative or unstable.

In fact, some of the advantages of the invention can be obtained without any axial gap. One such form contemplated would have two radial gaps, each formed by laminated disks, with only the disks forming the outer poles slotted and well saturated in the pole region. It may be noted also that this form, as at present contemplated, would have the rotor formed mainly of the permanent magnet in a simple small cylinder with caps of Armco iron on which the inner disks would be pressed. The outer disks may be carried by annular ends of a U-shaped soft iron yoke, which for the most part would be spaced well away from the permanent magnet. Thus, there would be a minimum of leakage flux, and virtually all of the flux available from the permanent magnet would be used in producing lift.

In the exposition for the purpose of clarity and simplifying nomenclature, it has been difficult to avoid discussing everything in terms of a magnetic bearing. It should be remembered that a bearing is merely a special case of what the invention really is and that is a magnetic suspension.

Thus to illustrate, the axial and theoretically the radial gap structures could be square or hexagonal. This would destroy all rotation but the supporting or suspension action would still be there.

The normal gap length separating the poles is subject to considerable variation, but the poles should always be separated by at least one full pole width. Beyond this three generalizations supported by later discussion, may be stated:

(*a*) There is an optimum point of operation where the gap is approximately equal to six times the magnetic pole width.

(*b*) There is an efficient and effective working range for the gap from 300 percent of the pole width to 1,000 percent of the pole width.

(*c*) Gaps ten or more times the magnetic pole width produce good results but at a sacrifice in effective use of the M. M. F.

Figure 3:
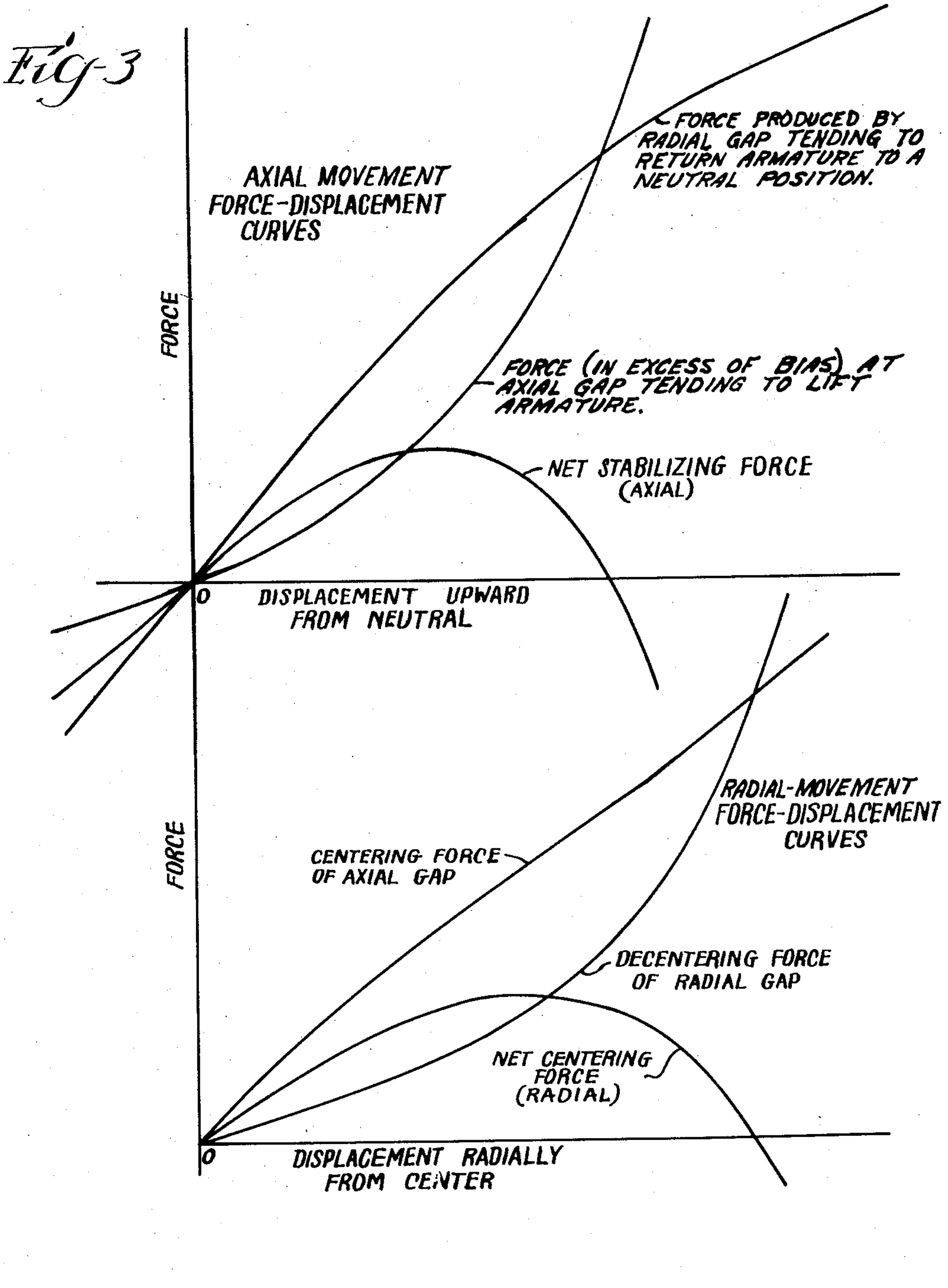
Fig. 3 is a chart of performance curves, the upper set of curves being for axial forces and the lower set of curves for radial forces . (See heading I.)

Fig. 3 shows in a qualitative way the type of performance curves to be expected from the structure of Fig. 1.

The upper or axial curves show approximately and qualitatively the axial forces that would be obtained if the gap constants were chosen so that stability along the axial direction is produced, and the curves give the general proportions or order of relative magnitude of the pull, counter pull and net stabilizing forces. It should be noted that such performance involves a sacrifice of stability along the radial direction. No units or values have been placed for the ordinates or abscissas, as the intent is to show only relative proportions between the forces which are possible of attainment.

The lower or radial curves show approximately and qualitatively the radial forces that would be obtained if the gap constants were chosen so that radial stability is obtained and the curves give the general proportions or relative order of magnitude of centering, de-centering and net centering force. As in the former case, it should be noted that such performance involves a certain sacrifice of stability along the axial direction.

Fig. 1 has actually been shown with the gap constant of the radial and axial gaps such as to approach stability in both directions and therefore with neither of the curve conditions of Fig. 3 existing with reliability. In other words, the position and gap relations shown in Fig. 1 are such as to give a maximum figure for overall net stability, lying at a point on the graph of Fig. 15 favorable to overall stability.

J. MAGNETIC WIDTH OF POLE

In various places herein, reference is made to "pole face width" or "pole width." In the case of a rectangular pole on which the calculations are based, these terms are synonymous, and the width is obviously the distance between the two parallel sides. If the pole is tapered, as in Fig. 4, the question arises where to measure its true width. From the flux plot of Fig. 4, it can be seen that even the extremely wide tapering shown would not alter the permeance in an important degree, but, nevertheless, it would change it some because the flux lines toward the outer part of the field form would be shortened slightly. It is evident that there must exist some truly rectilinear pole width, slightly over .005" which will produce the same permeance as the tapered section within the same field-form width.

The magnetic width of a non-standard pole is therefore defined as the width of the parallel-sided (standard) pole which will produce the same permeance, the length of gap of the actual pole and the standard pole being the same. This definition assumes that the permeance be determined over the same field-form width for the standard and non-standard pole. Whether the usual value of .280 cm. field-form width having the permeance values of Table I or the infinite width with the permeance values of Table V be used would have almost no difference on the width determination. The gap of the actual pole is taken as the shortest distance between the poles.

Magnetic width can be more definite than measured width. The poles could be tapered, knife-edge, or even rounded, in which cases the magnetic width would be definitely determinable. In these latter cases, pole width by direct measurement would be difficult or impossible.

Magnetic width is secured by first measuring the actual gap permeance P for a given gap length (separation) for a pair of the poles under consideration. From this, the determination of the standard pole having the same permeance with the same gap separation can be made with accuracy by reference to Table I, hereinafter discussed. In practical structures it is possible to measure P with accuracy, therefore, using Table I, the magnetic width can always be obtained.

With most pole pairs, measured width will suffice but the preceding determination of magnetic width is given so that solutions can be expressed in general terms regardless of odd shaping of pole faces.

In using Table I to determine magnetic width, it is necessary to note that the pole pairs for which the permeance is given can be magnified or decreased without changing the permeance. As an example, the permeance for a pole pair .005" wide and with a gap of .010" is 2.815. The permeance for a pole .010" wide and .020" gap is still 2.815. The permeance for a pole .006" wide and with a gap of .012 is the same 2.815. This rule can be proved for all values in the table and for all factors of magnification or of reduction.

To explain the use of the above, assume that an irregular or tapered pair of poles being investigated has a gap of .020" and a measured permeance of 2.148. This is higher than standard for a rectangular pole pair with a .020" gap. Table I is referred to and it is found that 2.148 corresponds to a pole .005" wide and a gap of .018". If this combination is "magnified" till the gap becomes .020", the pole width is increased to .00555" and this is the true magnetic width.

The pole taper shown in Fig. 1 is enough to facilitate maintaining saturation through the intended cross-sectional length of pole, but has only slight effect on the permeance of the gap. Hence the poles may be considered as having a magnetic width, as well as a face width, of approximately .005".

L. BASIC TABLES TO AFFORD A GENERAL SOLUTION

The description has been devoted to a specific model of magnetic suspension for definiteness and clarity. The purpose, however, is to derive the laws which govern such suspensions and in general terms prescribe the conditions to be met to produce a good magnetic suspension having a range of useful and effective results. Completion of this detailed and general analysis uncovers some unexpected results. To be accurate, it is necessarily somewhat complex and detailed. In the pursuance of these details, however, vital facts and relations are discovered which mean the difference between success and failure. The work in the flux plotting and in most of the calculations and derivation of equations based thereon has been performed by the inventor Stanley S. Green, who accepts the responsibility for the accuracy thereof, and of the conclusions dependent on them.

The problem of magnetic flotation has always been difficult because of the number of variables and the necessity of securing an accurate optimum relationship between them. Previously this has been tried, with doubtful results as to learning to predict accurately, by the experimental route. We here describe via the mathematical and analytical path the method which led to the form of Fig. 1. It is proposed to examine all the primary magnetic force effects in a generalized form of magnetic suspension and to determine the quantitative relations between them. These will provide new information and will guide and simplify any experimental work leading to confirmation of the analytical conclusions. Any discrepancies between analytical and test results will then be caused by the effect of secondary phenomena but such discrepancies should be relatively small and the better understood as a result of the exact knowledge of the primary performance.

LA. RATE OF CHANGE OF MAGNETIC FORCE

From the mode of operation it can be seen that the smaller the change in force with change in gap length, the more successful will be the result. For actual performance in the axial and radial directions for any amount of displacement from the neutral position for a given model, actual forces and their differences can be computed. For the purpose of analysis, however, in order to get at the optimum relationship of gaps, pole widths and other dimensions, it is easier to use the rates of change of these forces. These are the space gradients of the forces. To be specific in an example, if the actual magnetic force in, say the axial direction with a given gap is 200 grams, and if closing the axial gap by a distance of .001″ (used here throughout as the base unit of displacement) changed the axial force to 205 grams, then the force gradient would be 5.

By starting out with the suspended element in a position of equilibrium and symmetry—a neutral position—and analyzing the respective force gradients at or on departure from this position, a powerful and effective means of research is available. The significance of this method and the uses of the force gradient tables to be derived will be evident as the work progresses.

LB. THE POLE SECTION

For simplicity, treatment of the problem has been carried through with concrete figures using two opposing rectangular pole sections .005″ in width and with any gap length $g$ separating them. Pole face width and gap length have been expressed in inches because of the American habit of thinking in these terms. Other dimensions and magnetic quantities are in c. g. s. units.

Conclusions secured for the apparently special case of the .005″ pole width are in reality not special at all. Since the results are for the generally rectangular section, they may be converted to be true for a pole width of twice that, or of ten times that, with equal validity. In this conversion, gap lengths and base units of displacement would, of course, be twice or ten times in value, the same as for pole width.

The results have been expressed in tables and can in part be considered as discoveries as to the magnetic force relationships between magnetic poles of generally rectangular cross section when in use for the purpose of magnetic suspension. The tables can be abbreviated, but some value is lost in so doing. The tables and the relations expressed in them can be used in computing limits within which future magnetic suspension performance will fall, regardless of design details. As such the unabbreviated tables are of value for future progress in the magnetic suspension art where quantitative relations have been conspicuous by their absence.

LC. FLUX PLOTTING

Pole sections of simple rectangular form are a favorable subject for accurate flux plotting,[3] especially when they are aligned or symmetrical. This enables the permeance and the force between poles to be computed by methods well known to electrical engineers.

Figure 4:
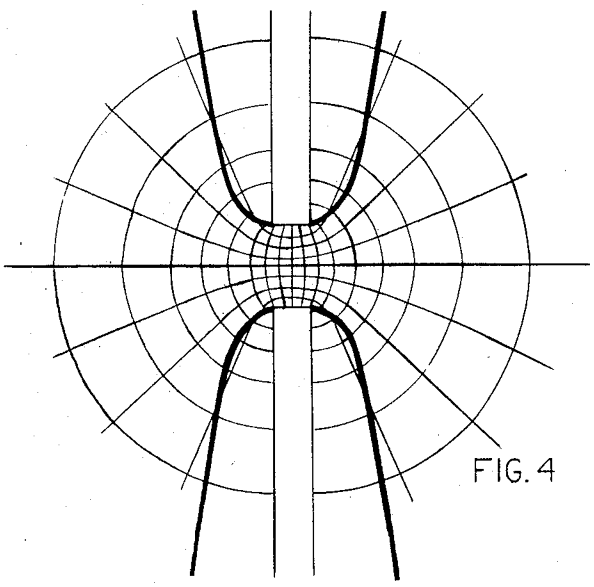
Fig. 4 is a flux plotting diagram for a pair of aligned poles of generally rectangular cross section. (See heading LC.)

Fig. 4 shows one of many flux plots for two symmetrically placed poles separated by a gap of .010″. The plotting is done to a greatly enlarged scale which adds to accuracy. The heavy curved lines surrounding the rectangular pole outlines show the amount the pole sections might have to be increased if the magnetizing force between them were such as to produce saturation at the tip surfaces. Such slight pole tapering, when necessary, does not change permeance or force relations in an important degree and can be allowed for as discussed under heading J.

Figure 6:
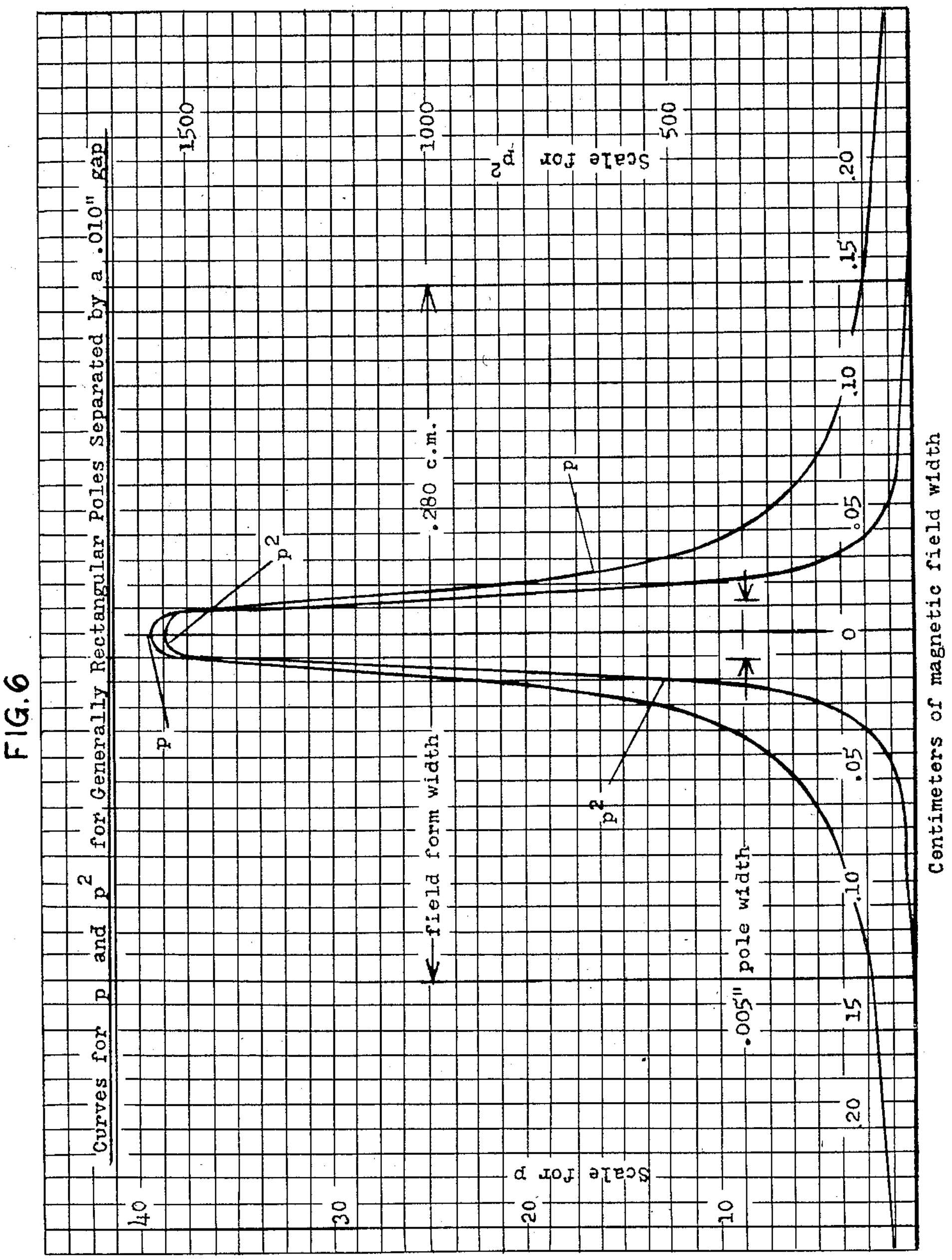
Fig. 6 is a diagram charting the curves of permeability and permeability squared for the poles of Fig. 4, separated by a gap of .010″. (See heading LC.)

The length of path of any flux line can be determined from the flux plot. The reciprocal of its length in centimeters equals the permeance of any elementary path and is denoted by the letter $p$. In Fig. 4 the horizontal line bisecting the flux plot may be taken as the $x$-axis. Along this axis is measured the distance from the center of the field, and the width to be considered of the magnetic field surrounding the two poles, which is called the field-form width. If values of $p$ are plotted as ordinates along the $x$-axis, the result is a permeance curve as shown in Fig. 6. The area under the $p$ curve for a given field-form width is equal to the permeance between the two poles within that field-form width. This is designated by the letter P and is of fundamental importance in all quantitative computations of the magnetic performance.

By making a sufficient number of plottings, accurate permeance values can be determined over a range of gap values from .001″ to .060″. These are given in Table I, the tables being found at the end of this description.

A permeance squared curved is obtained by squaring all the ordinates of the $p$ curve. This is shown in Fig. 6. The area under the $p^2$ curve is proportional to the magnetic force between the poles. The current exposition will not be burdened with the detailed explanation of this as the technique has been long used by electrical engineers.[4] Using the fundamental equation for magnetic force, it is sufficient to say that a function can be derived which will give the magnetic force between the poles throughout the range of gap values given above.

In the integration of the $p$ curves and the $p^2$ curves, the choice of field-form width is very important. The reason will be apparent as the explanation proceeds. Two cases of field-form width have been considered in connection with the .005″ width rectangular poles. The first width is .280 cm. which has been used as a realistic one for practical attainment. The second width is infinity and it also is representative of certain actual conditions.

[3] Standard Handbook for Electrical Engineers, Sec. 2, paragraph 42.

[4] Electrical Engineering, Christie, third edition, art. 72.

Values in the tables are given in such a way that the field-form width to which they apply is known.

LD. TABLES OF FORCE FUNCTIONS DERIVED FROM WORK OF FLUX PLOTTING

In considering variations of force, it should be recognized that they may occur under any of a number of conditions, the two significant ones for this study being:

(1) A constant M. M. F. is supplied between the poles, producing a variable flux as the gap is changed.

(2) A variable M. M. F. is supplied between the poles, producing a constant flux regardless of the fact that the gap may change.

Condition (1) is easy of achievement but produces very wide changes in the force as the gap is changed, with consequent high values of space rate of change. The forces have been computed accurately and the result (on the basis of a field-form width of .280 cm.) expressed in terms of mathematical quantity called a force function F over a range of gap from .001" to .060". This force function, from which the force can be computed, is given opposite each value of the gap $g$ in Table II. To compute force from values of F in the table, $$G=H^2LF \qquad (1)$$

where,

G is the force in grams
H is the constant applied M. M. F. in gilberts
L is the peripheral pole face length in centimeters A subscript such as $F_{.010}$ indicates the value for F in the table where the gap is .010". $F_c$ would indicate a value of F in the table where the gap was equal to some known or unknown length $c$.

It has already been noted that the space rate of change of the magnetic force is of paramount importance. This is the derivative of F with respect to $g$. It is obtained by a graphic differentiation (not shown) and to be obtained accurately it is preferable to derive it for each .001" gap interval along the F curve. These values, often called "slope," are represented by the letter S and are also given in Table II for a field-form width of .280 cm.

Figure 8:
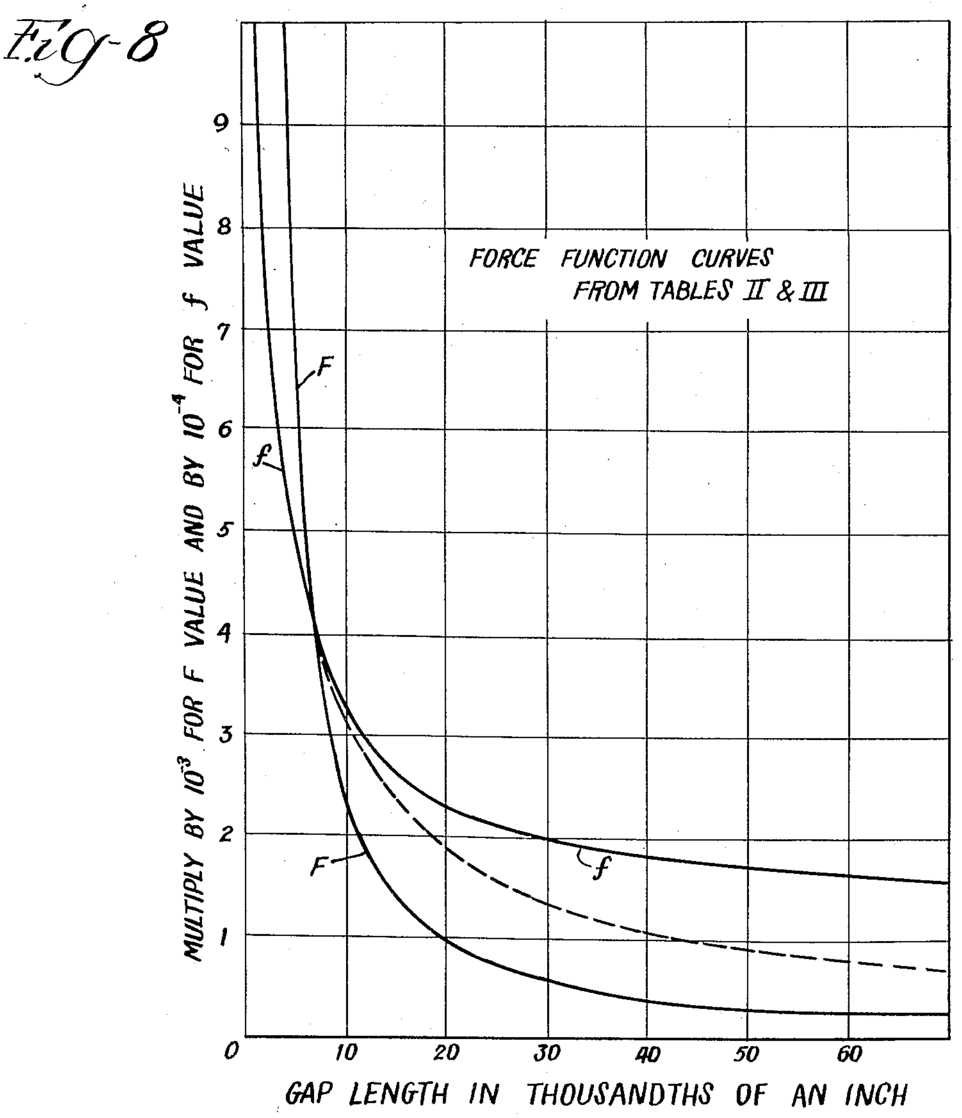
Fig. 8 is a diagram of force function curves, plotted from Tables II and III. (See heading LD.)

The F curve, the slope of which is represented by S, is plotted in Fig. 8 from Table II.

By additional calculations, described below, assuming constant flux (condition 2), Table III has been prepared. Values for both force function $f$ and slope $s$ are given in Table III for a field form width of .280 cm. Subscripts used with the $f$ and $s$ functions, as explained for Equation 1 refer to the length of gap in the table giving that function.

The means of supplying the variable M. M. F. may be ignored for the moment and delivery of a constant flux through the field-form assumed. The value of the force function under these conditions will be designated by $f$, from which the force can be computed by the equation, $$G=L(P_0H_0)^2f \qquad (2)$$

in which

G is the force in grams.

$P_0$ is the permeance of the gap in its initial or neutral position, considering only a field form width of .280 cm.

$H_0$ is the M. M. F. applied across the gap in this initial or neutral position.

L is the peripheral pole face length.

For the flux held constant across the gap, therefore, $$G=L(HP)^2f \qquad (3)$$

It should be noted that (HP) for any gap equals the flux across the gap. In using Equation 3, it is usually convenient to take H and P values as at the neutral or centered position of the device, for which HP is usually known or already assumed.

The values for $f$ in Table III were computed from previous tables after first determining what relation F for the equation $G=LH^2F$ must have to $f$ for the equation $G=L(HP)^2f$ (Equations 1 and 3). This relationship is readily apparent if we multiply the right-hand side of Equation 1 by $$\frac{P^2}{P^2}$$

thus deriving $$G=L\frac{H^2P^2F}{P^2}$$

or $$G=L(HP)^2\frac{F}{P^2}$$

This latter equation is Equation 3 except that $$\frac{F}{P^2}$$

appears in place of $f$. Hence it is apparent that $f$ equals $$\frac{F}{P^2}$$

Therefore $f$ was calculated for each gap width by dividing the value of F by the value of $P^2$ for the same gap width in Tables II and I.

The $f$ curve is plotted in Fig. 8 from Table III. Because this $f$ curve contemplates a constant total of the flux within a .280 cm. field width, the decreasing value of $f$ reflects a shifting distribution of flux from the most concentrated zone outwards toward the boundary of the field-form. The preferred saturated poles of this invention tend to prevent even as much shift in distribution as is represented by this curve. There would be a much greater shift if constancy were only assumed for an infinite field width, as represented by the broken line curve plotted from Table VII.

Although Tables I, II and III are for pole pairs of rectangular cross section and .005" width, they can be used for other sizes by conversion (heading LB) and are approximately correct for other shapes of the same magnetic width (heading J).

M. FORCE AND STABILITY CALCULATIONS USING BASIC TABLES

Having provided the foundation data of Tables I to III, they may be used in various calculations. Exactness is necessary which makes notation and formulas essential even though a rough understanding of the operation may be obtained without them. Some considerations of the invention depend on the exact expression of the primary interrelated phenomena. Equations have been numbered for reference and a collected summary of the notations used has been included at the end for easy reference.

MA. GAP CONSTANT

In using Formula 1 for a given model or embodiment of the invention, a gap constant K can be substituted for the constant value $LH^2$.

Likewise, in using formula 3 for a given embodiment of the invention, a gap constant $k$ can be used for the constant value $L(HP)^2$.

The validity of this simplification is apparent from the fact that L is a fixed dimension (peripheral pole length) in the model, and H is constant by definition, when using the constant M. M. F., Equation 1. Likewise, when using the constant flux, Equation 3, the flux represented by HP is constant by definition.

MB. FORCE GENERATED LATERALLY BY POLE DISPLACEMENT

A pair of poles if laterally displaced, one from the other, produces a restoring force which tends to bring them back to symmetrical relation. To determine this force refer to Fig. 9. Two poles are represented which have been laterally displaced, causing a magnetic field such as that shown in Fig. 5.

Figure 9:
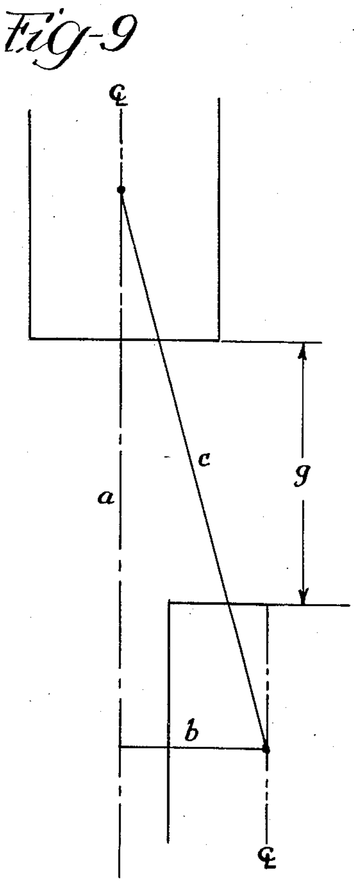
Fig. 9 is a diagram showing the derivation of sideways force between the poles of Fig. 5. (See heading MB.)

In Fig. 9 let $g$ be the gap distance if the poles were aligned. The various lines of magnetic flux between the two poles enter and act and upon a considerable surface, including not only the immediate opposing faces but much of the pole sides. Acting in this way, the sum total of the force action, caused by the lines can be considered as being concentrated at a single point or action center in each pole. The side of the triangle $c$, connecting these action centers, is the resultant line of action of the force exerted between the poles. In the triangle having the sides $a$, $b$ and $c$, we may elect to express the length of $a$ in terms of $g$ by using a constant such that $a=zg$ where $z$ is a value to be determined either by calculation or by experiment. The displacement distance between the two poles is, of course, represented by $b$.

Let the force along the line $b$ which is the lateral restoring force, be represented by $X_b$. Let the force acting along the line $c$ be represented by $X_c$. Then from the force triangle, $$X_b = X_c \text{ sine } \tan^{-1}\frac{b}{zg} \qquad (14)$$

When the displacement, and consequently the displacement angle is small, this equation can be written:

$$X_b = X_c\frac{b}{zg} \qquad (15)$$

This is because the sine and the tangent of small angles are nearly equal. The last equation is extraordinarily useful in simplifying the calculations.

In using either of the above equations, it is necessary to known $X_c$. For very small displacements, of course, $X_c$ can be taken as $F_g$. For larger displacements, it has been found from a number of flux plottings with lateral displacement, that the valve of $X_c$ can be computed from the force function curves of Tables II or III with the value of $g$ assumed to be the diagonal distance between pole faces along the side $c$ of the force triangle. This can be readily computed since all angles in the triangle $abc$ are known.

Computing values of $z$ for the different gap lengths is an extended and tedious process. Resort to experiment, using the actual structure of Fig. 1 was therefore made to determine these values and a few such were roughly checked by graphical computation and flux plotting. Resulting values of $z$ are given in Table XIII.

Figure 5:
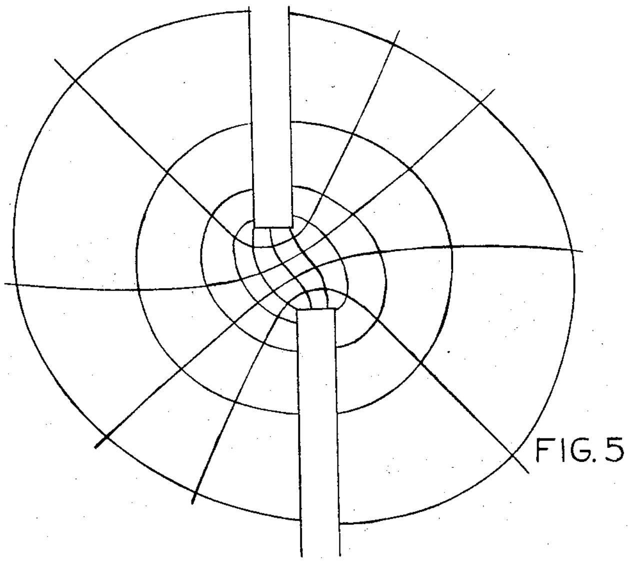
Fig. 5 is a somewhat similar diagram for the same poles displaced laterally from one another. (See heading MB.)

A sufficient number of non-symmetrical flux plottings, such as that of Fig. 5, shows that Equations 14 and 15 are reasonably accurate for all gaps in excess of .005″ where the displacement is not in excess of half of the gap. They are very accurate for gaps larger than .005″ and for very small or differential displacements where the simplified Equation 15 can be used.

They cannot be used below .005″ without introducing substantial errors, these errors increasing rapidly as the gap approaches zero. For such relatively small gaps, direct flux plotting methods must be resorted to for each condition (or different formula derived) rather than depending on the above formula.

Formulas 14 and 15 can be used in computing the countering or axial force of the radial gap and they are also used as the first step in computing the centering force of the axial gap. For determining the gradient, $b$ is .001″, the gradient unit, and $X_c$ may, for this small displacement, be taken as $f$, thus yielding formula 22 under heading ME.

MC. DETERMINATION OF CENTERING FORCE CAUSED BY AXIAL GAP

Figure 10:
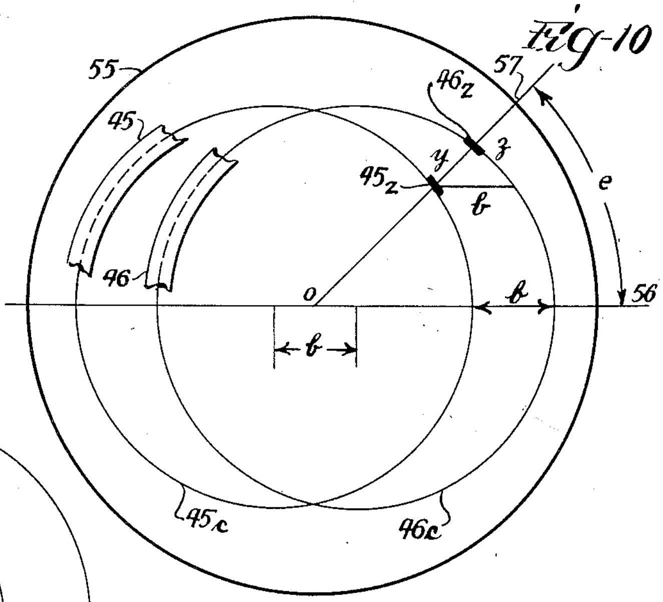
Fig. 10 is a diagram for deriving the centering force of displaced annular poles. (See heading MC.)

The value of the centering force as well as the centering force gradient is derived as follows:

In Fig. 10, 45 and 46 represent the two axial pole sections displaced from perfect alignment by a distance $b$. For the purpose of computing the effects of the displacement it is permissible to consider that the force effect of each pole is concentrated at its center line. The two center line circles are represented by $\mathbf{45}_c$ and $\mathbf{46}_c$ and they overlap by the distance $b$.

Any circle 55 can be drawn around point O as a center having its position midway between the centers of $\mathbf{45}_c$ and $\mathbf{46}_c$. Around center O any angle $\theta$ can be taken. This angle is formed by the two radii O–56 and O–57. Where the radius O–57 intersects the two center line circles, there are two elemental lengths of circular pole section, indicated in the figures by $\mathbf{45}_z$ and $\mathbf{46}_z$.

The total restoring or centering force produced by the two displaced pole circles will be designated by $R_a$. The same centering force for a displacement of only .001″ (that is $b$=.001″) may be termed the centering force gradient or space rate of change and is designated by $r_a$.

An integration through 360° of the force along the radius O–57 generated by the elemental length $\mathbf{45}_z$ and $\mathbf{46}_z$ displaced from each other by the distance $y$ will produce the total centering force $R_a$.

This integration can be made simple with negligible sacrifice in accuracy by making it a step integration through about twenty-four zones to make up the 360°. In this way the lengths of the pole elements $\mathbf{45}_z$ and $\mathbf{46}_z$ each subtend 15°.

It is assumed that throughout the integration the elements $\mathbf{45}_z$ and $\mathbf{46}_z$ are parallel to each other. This is not really true at any point except where the radius O–56 cuts the circles, but the departure from parallelism at most points is very small when $b$ is small as compared with the diameter of the pole circles. This is always the case and the error caused by the assumption is negligible.

Equations 1 or 2, 14 and 15 are used in setting up the elemental or differential force under the integral sign. Since it acts along the line O–57, it must be multiplied by cos $\theta$ to reduce it to a restoring or centering force acting along the line O–56. Distance between the two elemental pole lengths is indicated by the letter $y$. A very close approximation for $y$ is $b$ cos $\theta$; although not exact it is so close as to make any resulting error negligible.

The integration produces the following results:

$$R_a = wk_af_c \text{ sine } \tan\frac{-1^b}{zg} \qquad (16)$$

or for very small displacements, $$R_a = wk_af_c\frac{b}{zg} \qquad (17)$$

and for a unitary displacement of .001″ where $R_a=r_a$, $$r_a = wk_af_c\times\frac{.001''}{zg} = wk_a\frac{f_c}{zg}\times 10^{-3} \qquad (18)$$

The subscript $c$ for the $f$ function indicates that diagonal gap distance is used conforming to the notation and meaning of Equations 14 and 15. For very small deflections $g$ could be substituted for $c$, the value of $f$ for the known initial gap being used.

For simplification, the term $k_a$ is used instead of $L(PH)^2$ as would be called for by Equation 2.

In the equations $w$ is a factor determined as a result of the integration.

Equations 16 to 18 can also be written substituting $K_a$ for $k_a$ and substituting the function F for $f$, if a constant M. M. F. is contemplated in calculations.

The value of $w$ has been determined under a wide range of displacement $b$ and gap length $g$, using both the F function and the $f$ function. For small displacement values and for gaps ranging from .005″ upward, the value of $w$ is .508. Under other conditions (as with a greater displacement) it can range from 5 percent to 15 percent greater but in no case does it become less than .508. For uniformity and conservatism it is desirable to adopt .508 for all conditions of gap, displacement or force function.

MD. DETERMINATION OF DECENTERING FORCE CAUSED BY RADIAL GAP

Fig. 11 shows schematically radial poles 47 and 48 with gap 34 in which a substantial degree of eccentricity exists. The amount is indicated by $b$.

The entire periphery of the gap can be divided into zones for the purpose of step integration. Zones 15° wide are sufficient for a high degree of accuracy. Each zone makes an angle $\theta$ with the axis 71—72 drawn through the gap at maximum and minimum points. Let the zonal poles and zonal gap be $\mathbf{47}_z$, $\mathbf{48}_z$ and $g_z$.

In integrating for the total unbalanced force along the axis 71—72, the individual forces of the zones are multiplied by $\cos\theta$. The integration is throughout the 360°.

It is necessary to find the individual force for each zone for the gap $g_z$. It can be shown that an exceedingly accurate expression for $g_z$ is $g-b\cos\theta$, or (where the gap is lengthened) $g+b\cos\theta$.

The maximum gap at 71 is $g+b$ and the minimum at 72 is $g-b$, where $g$ is the normal gap at the neutral position and $b$ is the displacement from the center.

It is assumed that each zonal gap acts independently of its neighbors in order to qualify the structure to be used with the $f$ function. Using the F function would produce a decentering force very much greater. Careful provision to accomplish or at least approach this independence of action must be made and means to do this have been described.

To insure that the $f$ function is applicable, gap flux must be held constant and it is necessary to have a length of saturated iron in each pole. This is shown as $\mathbf{47}_s$ and $\mathbf{48}_s$. These take the form of annular bands in which the radial width of the band is the radial length of the saturated path.

The maximum zonal force is $f_{g-b}$.

The minimum zonal force is $f_{g+b}$.

The difference between these two or the spread of force will be represented by $f_e$.

The total decentering force as a result of the step integration is represented by $R_r$ and is $$R_r = .245 k_r f_e \qquad (19)$$

The decentering force gradient as it builds up from the neutral or central position is found by assuming that $b$ is .001″, the displacement unit on which the gradients are based. In this case $f_{g-.001}$ equals $s_r$ and $f_{g+.001}$ equals $-s_r$. The difference between the two or the spread is $2s_r$. Letting $r_r$ be the decentering force gradient, this gives rise to the equation $$r_r = .490 k_r s_r \qquad (20)$$

In the above, $k_r$ is a constant for the radial gap equal to $L(HP)_r^2$.

ME. FORCE EQUATIONS

Since the typical application of a magnetic suspension is for a bearing, the suspended part will be called the rotor. Beginning with the rotor in an initial neutral position of equilibrium, expressions will be derived for the force gradients on it when it is displaced. The neutral position is one in which the rotor is centered so that the radial gap pole faces are concentric. In the neutral position the axial gap faces will also be aligned. In the neutral position, the radial gap faces will also be aligned. In order to produce this latter alignment, there must be a biasing force equal and opposite to the axial force of the axial gap in the neutral position. This can be produced by a weight or by another magnetic bearing on the opposite end of the shaft. In the treatment of the forces, the biasing force can be taken as constant and its presence neglected, as it is the change in the other forces on the rotor which is significant. Such changes are best expressed as force gradients or the space-rate of change in force. Such a gradient is obtained by taking the derivative or slope of the force curve. In Table II, S is the derivative of F and in Table III, $s$ is the derivative of $f$.

There are two forces acting in an axial direction on a rotor displaced upwardly toward the stationary pole normally axially aligned. One is the pull upwards of the axial gap and the other is the countering pull downwards of the radial gap. In the neutral position the latter is "0" and the former is balanced by the initial biasing force. Moved toward the pole from the neutral position axially by a given amount, both these forces change, and the relation of their rates of change determines equilibrium and whether the rotor will be forced back to the neutral position.

Similarly, there are two forces acting on the rotor radially. One is the centering force of the upper axial gap and the other is the decentering (or eccentric) force of the radial gap. Both of these forces are zero when the rotor is in the neutral position and increase rapidly as the rotor is displaced in a radial direction. The relation of their rates of change determines equilibrium and whether the rotor will be forced back to the neutral position.

The axial pull force gradient will be designated as $a_a$ and the axial countering force gradient as $a_r$. The difference between them is the net resultant axial force gradient, $a$.

The radial centering force gradient will be designated as $r_a$ and the radial decentering force gradient as $r_r$. The difference between them is the net resultant radial force gradient, $r$.

Note that in this notation, the subscript letters indicate the gap from which the force gradient is produced, while the primary letters indicate the line of action of the force gradient.

In analyzing force conditions as the rotor is displaced from neutral in any direction, all that is necessary is to take into account force gradients. For an accumulated displacement of several thousandths of an inch, total forces can always be obtained by addition or integration of these gradients.

Previous derivations enable us to write the expressions for the axial and radial force gradients as follows:

$$\text{Pull force gradient} = a_a = k_a s_a \qquad (21)$$

$$\text{Countering force gradient} = a_r = k_r \frac{f_r}{zg_r} \times 10^{-3} \qquad (22)$$

(See Equation 15)

$$\text{Net or stabilizing axial force gradient} = a = a_r - a_a \qquad (23)$$

$$\text{Centering force gradient} = r_a = .508 k_a \frac{f_a}{zg_a} \times 10^{-3} \qquad (25)$$

(See Equation 18)

$$\text{Decentering force gradient} = r_r = .490 k_r s_r \qquad (25)$$

(Equation 20)

$$\text{Net or stabilizing radial force gradient} = r = r_a - r_r \qquad (26)$$

The above equations for convenience have been written with lower case letters indicating the force and force gradient values of Table III which is based on the constant concentrated flux feature of the present invention. For a constant M. M. F. system, they would be equally valid but would then be written with the F and S notation of Table II, in which case K is used in place of $k$.

The above group of equations have been simplified by using the gap constants $k_a$ and $k_s$ which are a collection of other terms such that, $$k_a = L_a (P_a H_a)^2 \qquad (27)$$

$$k_r = L_r (P_r H_r)^2 \qquad (28)$$

Also, if it is desired to use Equations 21 to 26 with the F function, K, which must then be used, is $$K_a = L_a H_a^2 \quad (29)$$

$$K_r = L_r H_r^2 \quad (30)$$

The problem is presented as to the relation of the gaps and other factors to secure the best stability. The ratio of the countering axial force gradient to the pull axial force gradient measures stability in the axial direction. If it is greater than unity, a shortening of the axial gap is resisted and the device is stable. This ratio will be designated as $m_a$, and called the axial merit factor. Thus, $$m_a = \frac{k_r}{k_a} \times 10^{-3} \times \frac{f_r}{s_a z g_r} \quad (31)$$

The ratio of the centering force to the decentering force measures stability in the radial direction. If it is greater than unity, the device is stable and moving the rotor off-center is resisted. This ratio will be designated as $m_r$, and called the radial merit factor. Thus, $$m_r = 1.038 \frac{k_a}{k_r} \times 10^{-3} \times \frac{f_a}{s_r z g_a} \quad (32)$$

If we are interested in both axial and radial stability, the product of $m_a$ and $m_r$ is used herein to express the overall result and is designated as $m$. It is called the overall merit factor. Thus, from Equations 31 and 32, $$m = 1.038 \times 10^{-6} \times \frac{f_a f_r}{s_h s_r g_a g_r z^2} \quad (33)$$

It can be shown by trials with many values of $f$ and $s$ as well as by formal proof, that in order to provide a maximum $m$, $f_a$ should aqual $f_r$; $s_a$ should aqual $s_r$; $g_a$ should equal $g_r$. In this event, the last equation becomes, $$m = 1.038 \times 10^{-6} \times \left(\frac{f}{sgz^2}\right)^2 \quad (34)$$

Values of the $f/sg$ function, as well as the function $F/Sg$ and their squares are given in Tables IV and VIII. In using the values in these tables for the determination of stability, they must be used in conjunction with corresponding values of $z$ or $z^2$. It may be argued that combined values of the function $f/sgz$ could be presented and this is so. However, the present determination of the values of the $f/sg$ function, alone, are of a higher order of accuracy than the present knowledge of the values of the $z$ function. A separate presentation of them is therefore of value.

The chief value of the merit factors as defined in Equations 31 to 34 is that it makes possible the evaluation of a very complex situation. From a study of the tables of values of the stability factors and of the equations may be derived the important facts:

(1) That the overall merit factor is greatest when the radial and axial gap constants are equal.

(2) That a very high axial merit factor can be obtained at the expense of a correspondingly lower radial merit factor and also of a somewhat lower overall merit factor by selecting gap constants so that $$\frac{K_r}{K_a}$$

is large.

(3) That a very high radial merit factor can be obtained at the expense of a correspondingly lower axial merit factor and also of a somewhat lower overall merit factor by selecting gap constants so that $$\frac{K_a}{K_r}$$

is large.

(4) Surprisingly the overall merit factor as computed from Equation 34, taking into account the values of $z$ as determined from experimental measurement rises to a value of 1.56 at a gap of .040″. In theory this would indicate total magnetic flotation. Classical mathematical theory of three dimensional fields in the past has indicated that such support is impossible. The powerful effect of introduction of the constant flux field provided by the saturable sections of the poles appears to have introduced a new element, not taken into account in previous classical theory.

Regardless of whether the saturation benefits could overcome the classical theory, detrimental secondary effects, discussed elsewhere, could possibly whittle down the merit factor till it was only equal to or less than unity. Offsetting this last observation, however, is the certainty that considerably better merit factor functions can be obtained if care in design is taken to confine the constant-flux to a field form still narrower than .280 cm. More exact and extended experimentation will be required before the answer to this intensely interesting scientific question is settled. Table XIV gives the value of the overall merit factor $m$ as computed from Equation 34. It may be noted that the value of $m$, while less than unity at gaps of .020″ and below, has become greater than unity at a gap of .025″ and reaches a maximum of 1.56 at a gap of .040″ or eight times the pole width. It drops off slightly at still larger gaps.

The magnitude of the constants in Table IV from which the merit factors are computed can be regarded as a true discovery of importance, greatly facilitating design.

MF. NET STABILIZING FORCES

The values of the merit functions as given in Tables IV and VIII do not show where to operate with respect to gap length in order to obtain the greatest actual net stabilizing force for the application of a given M. M. F. The net stabilizing forces are given by Equations 23 and 26 and since it is now known that optimum results from one standpoint are obtained with the $k_a$ and $k_r$ constants equal, the following equations for this optimum condition can be derived from Equations 23 and 26:

$$\text{Net stabilizing axial force gradient} = a = k\left(\frac{f}{gz} \times 10^{-3} - s\right) \quad (35)$$

Net stabilizing radial force gradient=

$$r = k \times .508 \frac{f}{gz} \times 10^{-3} - .490ks \cong .5k\left(\frac{f}{gz} \times 10^{-3} - s\right) \quad (36)$$

The quantity in parentheses in the above two equations will be called the net stabilizing factor when the axial and radial gap constants are equal and will be designated by the letter $q$.

Note that for the condition of equal axial and radial gap constants that $r$ is only approximately one-half $a$ as given by Equations 35 and 36 but this not to say that $r$ cannot be made to equal or even to exceed $a$ providing that the condition of equal radial and axial gap constants is not imposed.

To recapitulate, again assuming equal gap constants, Net stabilizing factor:

$$q = \frac{f}{gz} \times 10^{-3} - s \quad (37)$$

Axial stabilizing gradient:

$$a = kq \quad (38)$$

Radial stabilizing gradient:

$$r = .5kq \quad (39)$$

N. EFFECT ON PERMEANCE AND FORCE OF THE FIELD-FORM WIDTH OF THE CONSTANT FLUX

Figure 12:
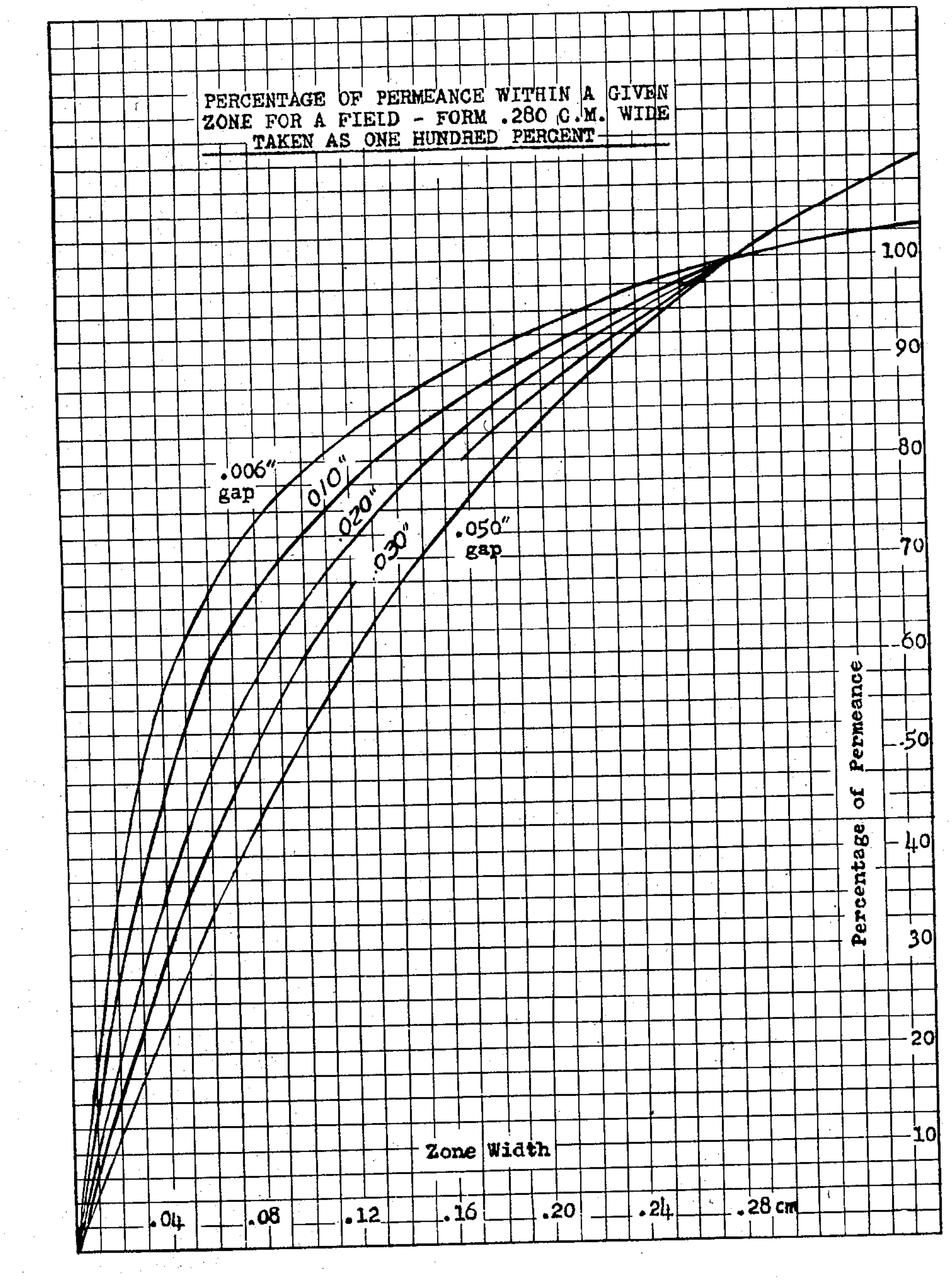
Fig. 12 is a diagram showing the distribution of permeance between aligned poles, such as those of Fig. 4, with a variety of gap lengths separating the poles. (See heading N.)

Fig. 12 and Table IX show the percentage of permeance within given zone widths for a field-form .280 cm. wide taken as one hundred percent. It has been stated previously that the choice of field-form width through which a constant flux is maintained is important and this figure illustrates why. The curves show examples of gaps ranging from .006" to .050". In the figure a zone width of, say, .14 would correspond to a field form of half the width of the chosen or standard value.

Although a preponderance of the permeance comes near the middle of the field-form, the flux outside of the .280 cm. field-form is not negligible in quantity. An extrapolation of the curves of Fig. 12 beyond .280 cm. enables a determination of a permeance table for a field form of infinite width. Table V gives permeance values for the field-form of infinite width. It is very useful as a basis for theoretical comparisons and, in practical design, for aiding in determining the amount of flux which must be supplied to make up for leakage. The greater the gap length for a pole pair as compared to the arbitrarily chosen .280 cm. field form width, the greater the difference between the values of P and F for a given gap, as compared with what they would be for the condition of infinite field form width. Comparison can always be made by looking up the corresponding values in Tables I and V and II and VI. Of course it is shown in detail elsewhere (Sec. O) that the actual positioning of the saturated section on the pole (or poles) can have the effect of largely confining the principal force-producing part of the field which it is desired to hold relatively constant, to an arbitrary field form width (such as the .280 cm. of the tables).

Fig. 12 also enables computation of flux densities in the pole section as the distance from the pole face increases. At a distance from the pole face approximately half of the field-form width, the full flux passed by the field form permeance is passed by the pole section, as can be understood from Fig. 4. Similar reasoning applies for any zone comprising only a fraction of the field-form width. This method of computation has been used in figuring the pole tapering illustrated in Fig. 1.

Figure 13:
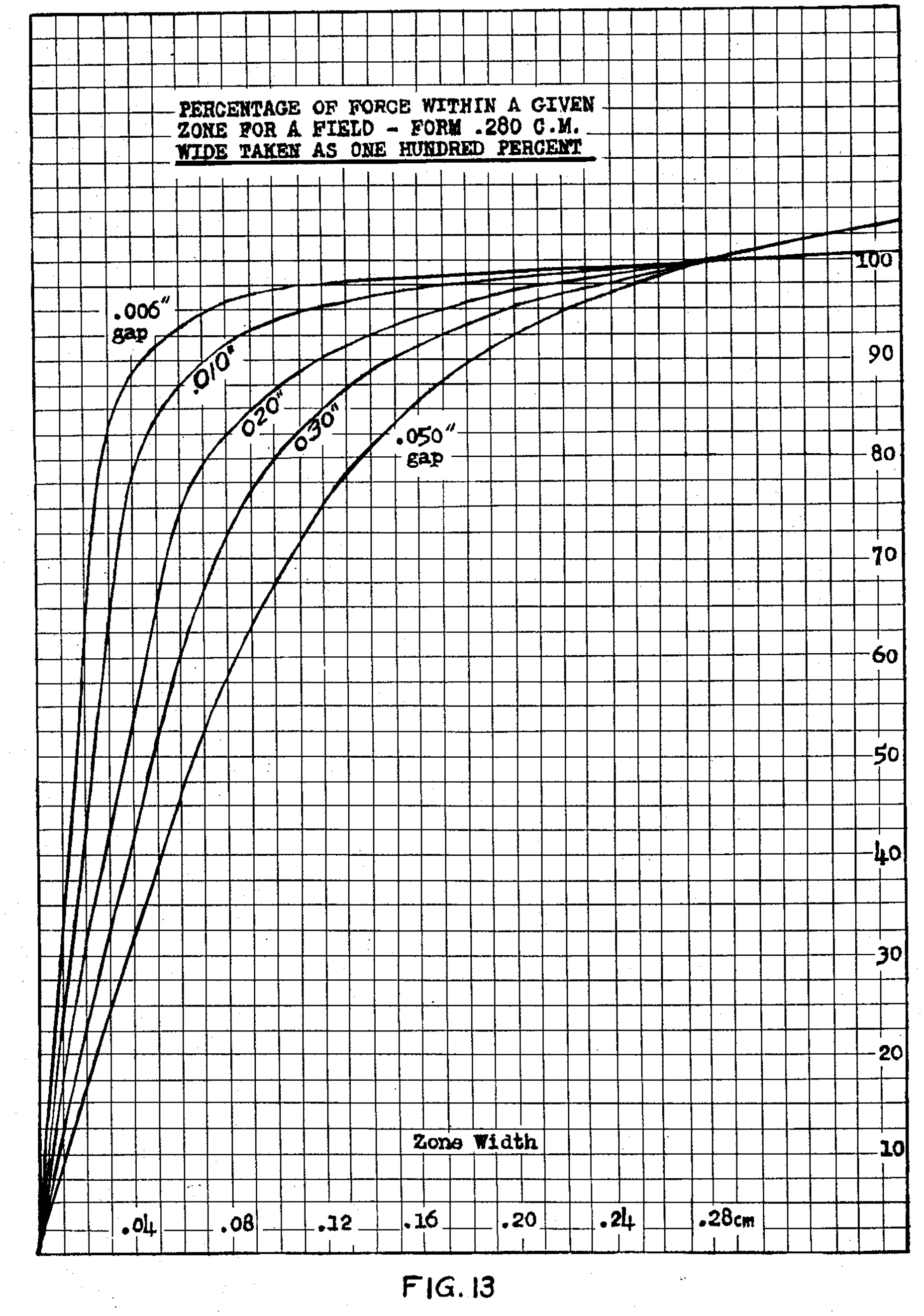
Fig. 13 is a diagram corresponding to Fig. 12 showing force instead of permeability. (See heading N.)

Fig. 13 and Table X give the same set of curves for force as Fig. 12 shows for permeance. These curves, also, can be used to extrapolate for the force function under an infinitely wide field-form but a feature of the information that Fig. 13 brings out is that all force beyond the .280 field-form boundary is practically negligible, especially for gaps of .030" and below. This is important as will be seen in a discussion of Fig. 16 to follow. About 90 percent of the force is generated in the zone which is half the width of the .280 field form.

O. LOCATION OF THE SATURATED SECTIONS

Figure 14:
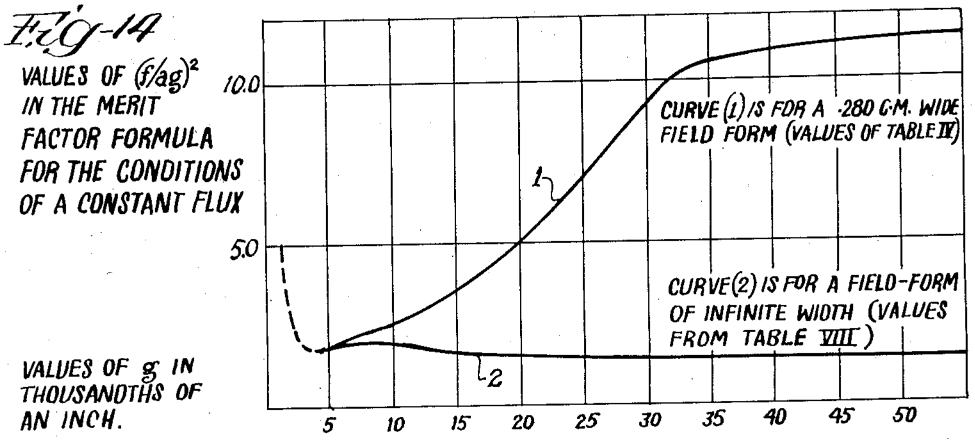
Fig. 14 is a diagram plotting the values of a key quantity used in the merit factor equation and indicative of the superiority of a constant flux suspension system in which the constancy of flux is concentrated within a field form .280 cm. wide. (See headings O, P.)

Results for conditions with the constant flux free to spread out in a field form of infinite width are relatively very poor. Table V gives the permeance for this condition; Tables VI and VII give the values of F and S and $f$ and $s$. Table VIII gives the stability factors. In Fig. 14 the value of $(f/sg)^2$ for the infinite field-form width has been plotted in comparison with the same function for the field form width of .280 cm. and the comment has already been made that the comparison is very poor. The reason for this is important to understand for it provides the key to an important physical requirement which must be met if performance in the .280 cm. field-form class is to be obtained.

The saturated sections do more than act as a valve to hold flux nearly constant. In a sense they provide a source of M. M. F. when the flux drops off. (Of course, they also absorb or "store" M. M. F. if the flux rises.) The price of this variable M. M. F. is a slight change in flux. It is important to apply this dearly purchased M. M. F. in a spot where it will do the most good. That spot is within the field-form and not at just any point in the magnetic circuit.

Figure 16:
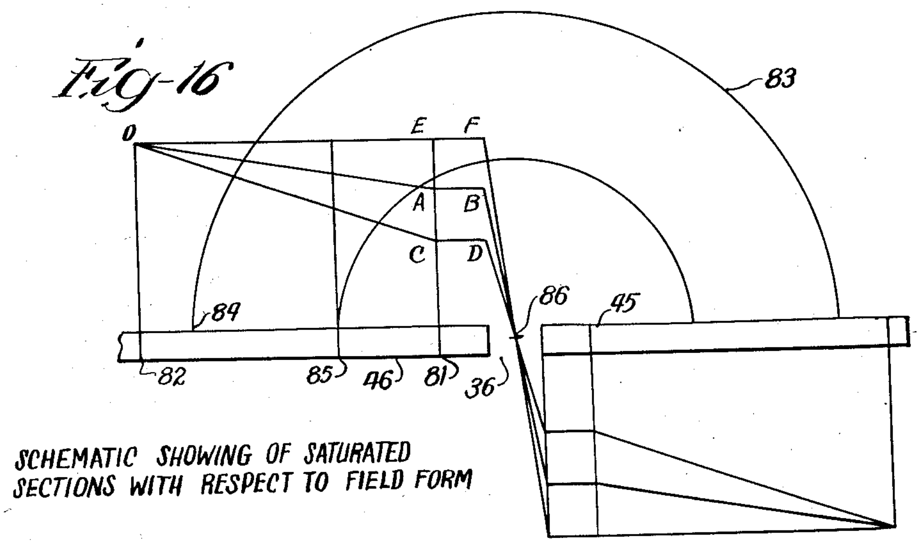
Fig. 16 is a diagram illustrating the importance of concentrating the constant flux within a narrow zone. (See heading O.)

Fig. 16, greatly enlarged and drawn approximately to scale, shows schematically the effect of the saturated sections with reference to the field form. 45 and 46 schematically show the opposing poles with the gap 36 between them. The circle 83 represents the path of a flux line at the boundary of the .280 cm. field form. It enters the pole surface at the point 84 which is approximately .280/2 or .140 cm. away from the point 86 midway between the poles. For the approximate determination of field-form width with respect to distance on the pole itself measured from the gap center, the flux lines may be considered as circles having their center at the gap center.

In Fig. 16, it is assumed that the cross section of the poles is arranged so that the saturated path begins at the point 82 (somewhat farther removed from the gap center than the point 84) and extends to the point 81. (For simplicity only one pole and saturated section will be discussed as the other is just like it.) The pole portion from 81 to the tip is that portion of the skin surface which is usually found to be below saturation and in which it is necessary to guard against peripheral flux migration as has been discussed elsewhere.

To the left of the point 82 where the saturated section begins, it should be remembered that the entire unrestricted M. M. F. of the circuit exists. This means that the distance from 82 to the gap center 86 must be at least great enough so that the expected gap length change during operation of the device will make negligible difference in force generated by the flux emerging from the pole at points to the left of 82.

This flux emerging from the left of point 82 is one of the secondary effects (called this because it is not specifically taken care of in the equations) discussed elsewhere and called the spill-over effect. To keep the spill-over effect to an acceptable minimum, the saturated section should begin at an approximate minimum of five times the gap length from the gap center (in Fig. 16 the gap center is at 86).

Referring again now to Fig. 16, there is a total and fixed amount of M. M. F. in the circuit to the left of point 82 and this is represented graphically by the length of the line 82–O.

(1) For a normal setting of the gap, it may be considered that the M. M. F. drops off or is absorbed by the saturated iron, until at the point 81 it reaches the value 81–A.

(2) By reason of a shortening of the gap, the flux through the saturated section is increased by a small amount which causes the M. M. F. to drop off to the value 81–C.

(3) If the gap is increased in value greater than that existing for the initial condition (1), the drop across the saturated section decreases till it is possible to have almost the entire circuit M. M. F. available which is indicated at 81–E. This M. M. F. flows the rest of the way through the unsaturated part of the pole, represented in the initial position by the line AB and is expended completely across the gap.

The M. M. F. variation occurs along a sloping line, such as OC or OA. Tables I through IV have been computed on the basis that the M. M. F. (whatever its value) is applied precisely (or in non-tapered form) at the point on the pole to produce the field form of .280 cm. width (that is, .140 cm. from the gap center). A consideration of the triangles OEC and OEA in Fig. 16 will show that the tapered M. M. F. variation may be considered as being applied as a non-tapered M. M. F. (of slightly less amplitude) at the point 85 which is intermediate between 82 and 81. With the relations which have been described for Fig. 16 it can be seen that this is the equivalent of having a field form somewhat narrower, even, than the .280 cm. for which Tables I to IV have been computed. Stated differently, the figures in Tables I through IV are conservative in that the equivalent of field forms narrower than .280 cm. can be obtained when the saturation extends very nearly to the pole tip and begins at a point five times the gap length back from the gap center.

The variable M. M. F. is purchased at the expense of a small flux change. It is desirable to apply this variation in the portion of the field form where most of the force is created (see Fig. 13 and the discussion thereon in heading N). The foregoing has described how this is done by the proper spacing and location of the saturated sections.

The discussion with respect to Fig. 16 may be summed up as follows:

(1) There should be a saturated section for each pole. Such a section in one pole helps but is not more than half as good.

(2) The beginning of the saturated section, as measured along the pole to the center of the gap, should be a minimum of approximately five times the gap length.

(3) The saturated portion should reach from the point where it begins to as close to the pole tip as practically attainable and preferably even to the gap surface.

(4) The length of the saturated path itself, must be sufficient to fulfill conditions (2) and (3) but it may be longer if desired, especially if the extra length is needed for "storing" sufficient M. M. F. This may be especially true if the poles are made of one of the nickel steels such as that of Fig. 7.

(5) The .280 cm. width of field form has been arbitrarily chosen in calculating the tables as one for which the necessary variation of M. M. F. is practicable of attainment in view of the principles (1) to (4) and in view of the field-form width data of Fig. 13 and Table X.

P. DISCUSSION OF THE PERFORMANCE RESULTS

One of the first observations to be made is that practically useful performance is confined within the scope of conditions where the flux between the poles is held substantially constant, preferably in a narrow zone. This is indicated by the fact that corresponding values of $s$ are smaller than those of S in Table II. This shows up in the curves of Fig. 8 where the slope of most of the F curve is steeper than the $f$ curve. Also in Table IV for a given gap, the overall merit figure for the constant flux condition is always higher than that for the constant M. M. F. condition, thus for a gap of .015", the comparison is 3.596 to .4325 or over 8 to 1. For this reason most comment is confined to the constant flux conditions, the values pertaining to which have been indicated by lower case letters. Thus Equations 21 to 39 have quite largely been expressed in the lower case notation.

Fig. 14 graphs the $f/sg$ function which is an important part of the over-all merit factor under two conditions, (1) when the field-form in which flux is maintained uniform is assumed to be .280 cm. wide, and (2) when constant flux is only assumed to be maintained in a field form of infinite width, with the result that increasing the gap length spreads the flux widely. Results for condition (2) are very much inferior. Data for Fig. 14 are contained in Tables IV and VIII.

The overall merit factor of condition (1) does not have a maximum and gradually increases until the gap values are very large. However, secondary factors, such as circular field-form aberration, enter in at the larger gap values to be a limitation (if taken into effect) and to actually cause the curve to slope down. Use of a device at very large relative gaps is also expensive in M. M. F. and is accompanied by a decrease of stability gradient, as shown below, so that it is very probable that the knee of the curve in Fig. 14 at a value of approximately .030" to .040" is as far as it is ordinarily desirable to go in operation, even if M. M. F. cost is disregarded as compared to performance.

Reliance upon the values of $f/sg$ is circumscribed by certain limitations in the method of deriving them. These limitations in particular stem from the use of Equation 15 for sideways pull gradient. Since in this equation, accuracy for gap values of .005" and below is not good, the high values of overall merit factor indicated in Fig. 14 below the gap length of .005" should be ignored.

From a consideration of Fig. 14, therefore, it appears that the useful operating range for the .005" pole width (constant flux) goes from a gap of about .015" to .050", or three to ten times the pole width.

Figure 15:
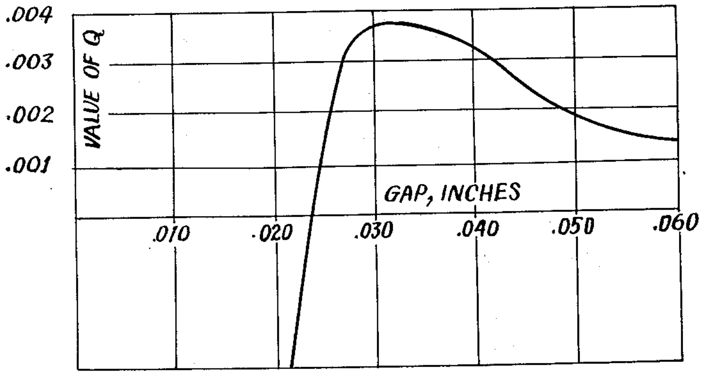
Fig. 15 is a diagram plotting the variation in net stabilizing factor for different gap lengths separating the poles. (See heading P.)

A somewhat clearer picture of the useful and desirable operating gap range is obtained from a study of Fig. 15 which shows the net stabilizing force gradient factor. As is noted on the curve sheet, this factor is equally applicable, axially or radially.

It should be noted that the net stabilizing factor $q$ has been developed using the conditions that the axial and radial gap constants are equal. Its magnitude, therefore, is a measure of the magnetic support simultaneously received in both directions. The curve shows that for gaps below .024" there is no support or even negative support (instability) in both directions. Above gaps of .024", however, $q$ becomes positive, reaching a maximum for a gap value of .030".

It should be carefully noted, however, that such expressions as $q$ which express overall effectiveness or stability (stability in both radial and axial directions at the same time) also show the potential merits when the device is used so that a high degree of stability is obtained in one direction at the expense of the other.

Q. SECONDARY EFFECTS

These are reckoned as such because they have been left out of the calculations. The reason that they have been left out is that in terms of the primary effects, their influence should be small. Also leaving them out keeps discussion within bounds. It is desirable to at least enumerate them. Nearly all have detrimental effects.

(1) Circular field-form aberration which has been dwelt upon to some extent (heading G).

(2) Departure of the flux from true constancy. This is the price paid for variable M. M. F. in the field form.

(3) Spill-over-effect. Use of some of the dearly purchased variations in M. M. F. at points in the magnetic circuit other than near the center of the field-form.

(4) Magnetic attraction generated outside the field-form, as from some distance back on the poles to surrounding objects. The effect is small.

(5) Some vestiges of peripheral flux migration will always remain no matter how carefully guarded against.

(6) Unknown effects.

S. TEST RESULTS

The mainstay of the present invention has been analysis. Experiment has been resorted to in the nature of confirmation. With the fundamentals established by analysis, a very wide scope of experiment and design is opened.

Specifically in the experiments to confirm the theory presented, a model of Fig. 1 was constructed exactly as described, essentially. An exception was that the model was furnished with electromagnets rather than permanent magnets so that the M. M. F. could be varied at will over a wide range.

With the aid of this model, general confirmation of the data in Tables I to XII was secured. By this is not meant that numerical confirmation was secured of all the figures in these tables; instead, the experimental and measured results fell closely or within the limits (for the conditions of the experiment) predicted by the tables. The figures as given in the tables for the conditions defined and assumed (and excluding influence of secondary factors described under heading Q) are more accurate than the usual experimental results would be.

One important exception should be noted: As described under heading MB, the experimental results were used to establish the important constant $z$ which is the key to determination of sideways or lateral magnetic force in terms of direct or total force. It is not felt that the values of $z$ thus determined and given in Table XIII are as accurate or reliable as the many other figures in the tables. Yet, for the time being, they must be presented as the best available since at the present time the inventors have not devised a more accurate way of securing $z$ throughout the gap range by computation alone. Without a doubt, improved values of $z$ can be secured in the future, either by measurement or by sheer computation, but this in itself, is not sufficient reason for delay in presenting the entire magnetic suspension picture in its present form.

In the actual experiments, a twin model of Fig. 1 was not available so that the existence or non-existence of complete magnetic flotation as indicated by the equations was not established.

*Table I (see headings J, L)*

[Permeance P vs. gap length $g$. For a field form .280 cm. in width.]

| $g$ | P | $g$ | P | $g$ | P |
|---|---|---|---|---|---|
| .001 | 9.095 | .021 | 2.012 | .041 | 1.490 |
| .002 | 5.827 | .022 | 1.972 | .042 | 1.475 |
| .003 | 4.672 | .023 | 1.934 | .043 | 1.459 |
| .004 | 4.065 | .024 | 1.898 | .044 | 1.444 |
| .005 | 3.669 | .025 | 1.864 | .045 | 1.429 |
| .006 | 3.392 | .026 | 1.832 | .046 | 1.416 |
| .007 | 3.178 | .027 | 1.801 | .047 | 1.402 |
| .008 | 3.007 | .028 | 1.772 | .048 | 1.389 |
| .009 | 2.865 | .029 | 1.742 | .049 | 1.377 |
| .010 | 2.744 | .030 | 1.716 | .050 | 1.365 |
| .011 | 2.638 | .031 | 1.691 | .051 | 1.352 |
| .012 | 2.543 | .032 | 1.667 | .052 | 1.341 |
| .013 | 2.459 | .033 | 1.644 | .053 | 1.330 |
| .014 | 2.385 | .034 | 1.622 | .054 | 1.319 |
| .015 | 2.318 | .035 | 1.601 | .055 | 1.308 |
| .016 | 2.256 | .036 | 1.580 | .056 | 1.299 |
| .017 | 2.200 | .037 | 1.561 | .057 | 1.288 |
| .108 | 2.148 | .038 | 1.543 | .058 | 1.278 |
| .019 | 2.099 | .039 | 1.524 | .059 | 1.269 |
| .020 | 2.053 | .040 | 1.507 | .060 | 1.259 |

Total flux across the pole, $\phi=HP$ where H is the M. M. F. in gilberts.

*Table II (see heading LD)*

[Force function F and slope S vs. gap for a given magnetomotive force. For a field form .280 cm. in width, with pole generally rectangular in cross section, .005" wide.]

| $g$ | F | S | $g$ | F | S |
|---|---|---|---|---|---|
| .001 | $90.99\times10^{-3}$ | $510.0\times10^{-3}$ | .031 | $.5601\times10^{-3}$ | $.0229\times10^{-3}$ |
| .002 | $28.35\times10^{-3}$ | $62.64\times10^{-3}$ | .032 | $.5388\times10^{-3}$ | $.0213\times10^{-3}$ |
| .003 | $14.73\times10^{-3}$ | $13.62\times10^{-3}$ | .033 | $.5190\times10^{-3}$ | $.0198\times10^{-3}$ |
| .004 | $9.386\times10^{-3}$ | $5.347\times10^{-3}$ | .034 | $.5005\times10^{-3}$ | $.0185\times10^{-3}$ |
| .005 | $6.687\times10^{-3}$ | $2.699\times10^{-3}$ | .035 | $.4831\times10^{-3}$ | $.0174\times10^{-3}$ |
| .006 | $5.098\times10^{-3}$ | $1.589\times10^{-3}$ | .036 | $.4669\times10^{-3}$ | $.0162\times10^{-3}$ |
| .007 | $4.068\times10^{-3}$ | $1.030\times10^{-3}$ | .037 | $.4517\times10^{-3}$ | $.0152\times10^{-3}$ |
| .008 | $3.355\times10^{-3}$ | $.7130\times10^{-3}$ | .038 | $.4374\times10^{-3}$ | $.0143\times10^{-3}$ |
| .009 | $2.837\times10^{-3}$ | $.5180\times10^{-3}$ | .039 | $.4239\times10^{-3}$ | $.0135\times10^{-3}$ |
| .010 | $2.447\times10^{-3}$ | $.3900\times10^{-3}$ | .040 | $.4112\times10^{-3}$ | $.0127\times10^{-3}$ |
| .011 | $2.145\times10^{-3}$ | $.3020\times10^{-3}$ | .041 | $.3992\times10^{-3}$ | $.0120\times10^{-3}$ |
| .012 | $1.904\times10^{-3}$ | $.2410\times10^{-3}$ | .042 | $.3878\times10^{-3}$ | $.0114\times10^{-3}$ |
| .013 | $1.708\times10^{-3}$ | $.1960\times10^{-3}$ | .043 | $.3770\times10^{-3}$ | $.0108\times10^{-3}$ |
| .014 | $1.546\times10^{-3}$ | $.1620\times10^{-3}$ | .044 | $.3668\times10^{-3}$ | $.0102\times10^{-3}$ |
| .015 | $1.409\times10^{-3}$ | $.1367\times10^{-3}$ | .045 | $.3570\times10^{-3}$ | $.0098\times10^{-3}$ |
| .016 | $1.293\times10^{-3}$ | $.1164\times10^{-3}$ | .046 | $.3477\times10^{-3}$ | $.0093\times10^{-3}$ |
| .017 | $1.193\times10^{-3}$ | $.0997\times10^{-3}$ | .047 | $.3389\times10^{-3}$ | $.0088\times10^{-3}$ |
| .018 | $1.107\times10^{-3}$ | $.0862\times10^{-3}$ | .048 | $.3305\times10^{-3}$ | $.0084\times10^{-3}$ |
| .019 | $1.032\times10^{-3}$ | $.0752\times10^{-3}$ | .049 | $.3225\times10^{-3}$ | $.0080\times10^{-3}$ |
| .020 | $.9657\times10^{-3}$ | $.0660\times10^{-3}$ | .050 | $.3149\times10^{-3}$ | $.0076\times10^{-3}$ |
| .021 | $.9075\times10^{-3}$ | $.0582\times10^{-3}$ | .051 | $.3076\times10^{-3}$ | $.0073\times10^{-3}$ |
| .022 | $.8556\times10^{-3}$ | $.0519\times10^{-3}$ | .052 | $.3006\times10^{-3}$ | $.0070\times10^{-3}$ |
| .023 | $.8092\times10^{-3}$ | $.0464\times10^{-3}$ | .053 | $.2940\times10^{-3}$ | $.0066\times10^{-3}$ |
| .024 | $.7674\times10^{-3}$ | $.0418\times10^{-3}$ | .054 | $.2876\times10^{-3}$ | $.0064\times10^{-3}$ |
| .025 | $.7295\times10^{-3}$ | $.0379\times10^{-3}$ | .055 | $.2814\times10^{-3}$ | $.0062\times10^{-3}$ |
| .026 | $.6950\times10^{-3}$ | $.0345\times10^{-3}$ | .056 | $.2755\times10^{-3}$ | $.0059\times10^{-3}$ |
| .027 | $.6634\times10^{-3}$ | $.0316\times10^{-3}$ | .057 | $.2698\times10^{-3}$ | $.0057\times10^{-3}$ |
| .028 | $.6344\times10^{-3}$ | $.0290\times10^{-3}$ | .058 | $.2643\times10^{-3}$ | $.0055\times10^{-3}$ |
| .029 | $.6077\times10^{-3}$ | $.0267\times10^{-3}$ | .059 | $.2590\times10^{-3}$ | $.0053\times10^{-3}$ |
| .030 | $.5830\times10^{-3}$ | $.0247\times10^{-3}$ | .060 | $.2539\times10^{-3}$ | $.0051\times10^{-3}$ |

Grams force, $G=LH^2F$.
Grams change per .001" gap change$=LH^2S$ where L is gap peripheral ength in cm. and H is M. M. F. in gilberts.

*Table III (see heading LD)*

[Force function $f$ and slope $s$ vs. gap for a given flux. For a field form .280 cm. in width, with pole generally rectangular in cross section, .005" wide.]

| $g$ | $f$ | $s$ | $g$ | $f$ | $s$ |
|---|---|---|---|---|---|
| .001 | $11.10\times10^{-4}$ | $5.100\times10^{-4}$ | .031 | $1.954\times10^{-4}$ | $.0203\times10^{-4}$ |
| .002 | $8.399\times10^{-4}$ | $2.700\times10^{-4}$ | .032 | $1.935\times10^{-4}$ | $.0191\times10^{-4}$ |
| .003 | $6.749\times10^{-4}$ | $1.650\times10^{-4}$ | .033 | $1.917\times10^{-4}$ | $.0181\times10^{-4}$ |
| .004 | $5.684\times10^{-4}$ | $1.065\times10^{-4}$ | .034 | $1.900\times10^{-4}$ | $.0172\times10^{-4}$ |
| .005 | $4.954\times10^{-4}$ | $.7300\times10^{-4}$ | .035 | $1.884\times10^{-4}$ | $.0164\times10^{-4}$ |
| .006 | $4.419\times10^{-4}$ | $.5350\times10^{-4}$ | .036 | $1.868\times10^{-4}$ | $.0157\times10^{-4}$ |
| .007 | $4.019\times10^{-4}$ | $.4000\times10^{-4}$ | .037 | $1.853\times10^{-4}$ | $.0151\times10^{-4}$ |
| .008 | $3.707\times10^{-4}$ | $.3120\times10^{-4}$ | .038 | $1.838\times10^{-4}$ | $.0146\times10^{-4}$ |
| .009 | $3.455\times10^{-4}$ | $.2520\times10^{-4}$ | .039 | $1.824\times10^{-4}$ | $.0141\times10^{-4}$ |
| .010 | $3.250\times10^{-4}$ | $.2050\times10^{-4}$ | .040 | $1.811\times10^{-4}$ | $.0135\times10^{-4}$ |
| .011 | $3.081\times10^{-4}$ | $.1690\times10^{-4}$ | .041 | $1.797\times10^{-4}$ | $.0132\times10^{-4}$ |
| .012 | $2.935\times10^{-4}$ | $.1430\times10^{-4}$ | .042 | $1.784\times10^{-4}$ | $.0129\times10^{-4}$ |
| .013 | $2.814\times10^{-4}$ | $.1210\times10^{-4}$ | .043 | $1.772\times10^{-4}$ | $.0125\times10^{-4}$ |
| .014 | $2.709\times10^{-4}$ | $.1050\times10^{-4}$ | .044 | $1.760\times10^{-4}$ | $.0122\times10^{-4}$ |
| .015 | $2.617\times10^{-4}$ | $.0920\times10^{-4}$ | .045 | $1.748\times10^{-4}$ | $.0119\times10^{-4}$ |
| .016 | $2.537\times10^{-4}$ | $.0804\times10^{-4}$ | .046 | $1.736\times10^{-4}$ | $.0115\times10^{-4}$ |
| .017 | $2.466\times10^{-4}$ | $.0710\times10^{-4}$ | .047 | $1.725\times10^{-4}$ | $.0112\times10^{-4}$ |
| .018 | $2.403\times10^{-4}$ | $.0631\times10^{-4}$ | .048 | $1.714\times10^{-4}$ | $.0109\times10^{-4}$ |
| .019 | $2.346\times10^{-4}$ | $.0567\times10^{-4}$ | .049 | $1.704\times10^{-4}$ | $.0106\times10^{-4}$ |
| .020 | $2.294\times10^{-4}$ | $.0517\times10^{-4}$ | .050 | $1.693\times10^{-4}$ | $.0103\times10^{-4}$ |
| .021 | $2,248\times10^{-4}$ | $.0466\times10^{-4}$ | .051 | $1.683\times10^{-4}$ | $.0100\times10^{-4}$ |
| .022 | $2.206\times10^{-4}$ | $.0419\times10^{-4}$ | .052 | $1.674\times10^{-4}$ | $.0097\times10^{-4}$ |
| .023 | $2.168\times10^{-4}$ | $.0382\times10^{-4}$ | .053 | $1.664\times10^{-4}$ | $.0094\times10^{-4}$ |
| .024 | $2.133\times10^{-4}$ | $.0347\times10^{-4}$ | .054 | $1.655\times10^{-4}$ | $.0092\times10^{-4}$ |
| .025 | $2.101\times10^{-4}$ | $.0319\times10^{-4}$ | .055 | $1.646\times10^{-4}$ | $.0089\times10^{-4}$ |
| .026 | $2.072\times10^{-4}$ | $.0292\times10^{-4}$ | .056 | $1.637\times10^{-4}$ | $.0087\times10^{-4}$ |
| .027 | $2.045\times10^{-4}$ | $.0271\times10^{-4}$ | .057 | $1.629\times10^{-4}$ | $.0084\times10^{-4}$ |
| .028 | $2.020\times10^{-4}$ | $.0251\times10^{-4}$ | .058 | $1.621\times10^{-4}$ | $.0082\times10^{-4}$ |
| .029 | $1.996\times10^{-4}$ | $.0233\times10^{-4}$ | .059 | $1.613\times10^{-4}$ | $.0080\times10^{-4}$ |
| .030 | $1.975\times10^{-4}$ | $.0217\times10^{-4}$ | .060 | $1.605\times10^{-4}$ | $.0078\times10^{-4}$ |

Grams force, $G=L(P_0H_0)^2f$.
Grams change per .001" gap change$=L(P_0H_0)^2s$.
Where:
$P_0$=initial gap permeability in neutral position.
$H_0$=gilberts across initial gap in neutral position.
$L$=peripheral length of gap in centimeters.

*Table IV (see heading ME)*

[Key factors affecting stability for a field form .280 cm. in width (with pole generally rectangular in cross-section, .005" wide).]

| Constant m. m. f. condition | | | Constant flux condition | | |
|---|---|---|---|---|---|
| $g$ | $\frac{F}{Sg}$ | $\left(\frac{F}{Sg}\right)^2$ | $g$ | $\frac{j}{sg}$ | $\left(\frac{f}{sg}\right)^2$ |
| .001 | $.1784\times10^{3}$ | $.0318\times10^{6}$ | .001 | $2.176\times10^{3}$ | $4.737\times10^{6}$ |
| .002 | $.2268\times10^{3}$ | $.0512\times10^{6}$ | .002 | $1.555\times10^{3}$ | $2.419\times10^{6}$ |
| .003 | $.3605\times10^{3}$ | $.1300\times10^{6}$ | .003 | $1.363\times10^{3}$ | $1.857\times10^{6}$ |
| .004 | $.4389\times10^{3}$ | $.1927\times10^{6}$ | .004 | $1.334\times10^{3}$ | $1.780\times10^{6}$ |
| .005 | $.4955\times10^{3}$ | $.2455\times10^{6}$ | .005 | $1.357\times10^{3}$ | $1.842\times10^{6}$ |
| .010 | $.6260\times10^{3}$ | $.3920\times10^{6}$ | .010 | $1.585\times10^{3}$ | $2.513\times10^{6}$ |
| .015 | $.6860\times10^{3}$ | $.4325\times10^{6}$ | .015 | $1.896\times10^{3}$ | $3.596\times10^{6}$ |
| .020 | $.7320\times10^{3}$ | $.5250\times10^{6}$ | .020 | $2.219\times10^{3}$ | $4.923\times10^{6}$ |
| .025 | $.7680\times10^{3}$ | $.5920\times10^{6}$ | .025 | $2.636\times10^{3}$ | $6.950\times10^{6}$ |
| .030 | $.7820\times10^{3}$ | $.6110\times10^{6}$ | .030 | $3.034\times10^{3}$ | $9.204\times10^{3}$ |
| .035 | $.7940\times10^{3}$ | $.6300\times10^{6}$ | .035 | $3.230\times10^{3}$ | $10.42\times10^{6}$ |
| .040 | $.8050\times10^{3}$ | $.6470\times10^{6}$ | .040 | $3.300\times10^{3}$ | $10.89\times10^{6}$ |
| .045 | $.8140\times10^{3}$ | $.6640\times10^{6}$ | .045 | $3.330\times10^{3}$ | $11.10\times10^{6}$ |
| .050 | $.8210\times10^{3}$ | $.6730\times10^{6}$ | .050 | $3.360\times10^{3}$ | $11.30\times10^{6}$ |
| .055 | $.8270\times10^{3}$ | $.6820\times10^{6}$ | .055 | $3.390\times10^{3}$ | $11.50\times10^{6}$ |
| .060 | $.8300\times10^{3}$ | $.6870\times10^{6}$ | .060 | $3.410\times10^{3}$ | $11.60\times10^{6}$ |

*Table V (see heading O)*

[Permeance P vs. gap length $g$ (infinite field width).]

| $g$ | P | $g$ | P | $g$ | P |
|---|---|---|---|---|---|
| .001 | 9.095 | .025 | 2.239 | .050 | 2.021 |
| .005 | 3.669 | .030 | 2.169 | .055 | 2.002 |
| .010 | 2.815 | .035 | 2.115 | .060 | 1.979 |
| .015 | 2.502 | .040 | 2.079 | | |
| .020 | 2.339 | .045 | 2.051 | | |

*Table VI (see heading O)*

[Force function F and slope S vs. gap for a given magnotomotive force (infinite field width).]

| $g$ | F | S | $g$ | F | S |
|---|---|---|---|---|---|
| .001 | $90.99\times10^{-3}$ | $510.0\times10^{-3}$ | .035 | $.5308\times10^{-3}$ | $.0173\times10^{-3}$ |
| .005 | $6.687\times10^{-3}$ | $2.699\times10^{-3}$ | .040 | $.4565\times10^{-3}$ | $.0126\times10^{-3}$ |
| .010 | $2.482\times10^{-3}$ | $.382\times10^{-3}$ | .045 | $.4005\times10^{-3}$ | $.0098\times10^{-3}$ |
| .015 | $1.461\times10^{-3}$ | $.1360\times10^{-3}$ | .050 | $.3566\times10^{-3}$ | $.0076\times10^{-3}$ |
| .020 | $1.023\times10^{-3}$ | $.0657\times10^{-3}$ | .055 | $.3213\times10^{-3}$ | $.0062\times10^{-3}$ |
| .025 | $.7832\times10^{-3}$ | $.0377\times10^{-3}$ | .060 | $.2922\times10^{-3}$ | $.0051\times10^{-3}$ |
| .030 | $.6333\times10^{-3}$ | $.0246\times10^{-3}$ | | | |

*Table VII (see heading O)*

[Force function $f$ and slope $s$ vs. gap for a given flux (infinite field width).]

| $g$ | $f$ | $s$ | $g$ | $f$ | $s$ |
|---|---|---|---|---|---|
| .001 | $11.10\times10^{-4}$ | $5.10\times10^{-4}$ | .035 | $1.182\times10^{-4}$ | $.0295\times10^{-4}$ |
| .005 | $4.954\times10^{-4}$ | $.730\times10^{-4}$ | .040 | $1.055\times10^{-4}$ | $.0230\times10^{-4}$ |
| .010 | $3.125\times10^{-4}$ | $.2380\times10^{-4}$ | .045 | $.9547\times10^{-4}$ | $.0184\times10^{-4}$ |
| .015 | $2.332\times10^{-4}$ | $.1220\times10^{-4}$ | .050 | $.8731\times10^{-4}$ | $.0151\times10^{-4}$ |
| .020 | $1.867\times10^{-4}$ | $.0752\times10^{-4}$ | .055 | $.8052\times10^{-4}$ | $.0127\times10^{-4}$ |
| .025 | $1.565\times10^{-4}$ | $.0524\times10^{-4}$ | .060 | $.7462\times10^{-4}$ | $.0112\times10^{-4}$ |
| .030 | $1.346\times10^{-4}$ | $.0385\times10^{-4}$ | | | |

*Table VIII (see heading ME)*

[Key factors, affecting stability for a field form of infinite width.]

| Constant M. M. F. condition | | | Constant flux condition | | |
|---|---|---|---|---|---|
| $g$ | $\frac{F}{Sg}$ | $\left(\frac{F}{Sg}\right)^2$ | $g$ | $\frac{f}{sg}$ | $\left(\frac{f}{sg}\right)^2$ |
| .001 | $.1784\times10^3$ | $.0318\times10^6$ | .001 | $2.176\times10^3$ | $4.737\times10^6$ |
| .002 | $.2268\times10^3$ | $.0512\times10^6$ | .002 | $1.555\times10^3$ | $2.419\times10^6$ |
| .003 | $.3605\times10^3$ | $.1300\times10^6$ | .003 | $1.363\times10^3$ | $1.857\times10^6$ |
| .004 | $.4389\times10^3$ | $.1927\times10^6$ | .004 | $1.334\times10^3$ | $1.780\times10^6$ |
| .005 | $.4955\times10^3$ | $.2455\times10^6$ | .005 | $1.357\times10^3$ | $1.842\times10^6$ |
| .010 | $.6480\times10^3$ | $.4270\times10^6$ | .010 | $1.313\times10^3$ | $1.727\times10^6$ |
| .015 | $.7180\times10^3$ | $.5150\times10^6$ | .015 | $1.269\times10^3$ | $1.601\times10^5$ |
| .020 | $.7780\times10^3$ | $.6060\times10^6$ | .020 | $1.240\times10^3$ | $1.538\times10^6$ |
| .025 | $.8300\times10^3$ | $.6890\times10^6$ | .025 | $1.194\times10^3$ | $1.426\times10^6$ |
| .030 | $.8560\times10^3$ | $.7320\times10^6$ | .030 | $1.174\times10^3$ | $1.379\times10^6$ |
| .035 | $.8740\times10^3$ | $.7630\times10^6$ | .035 | $1.162\times10^3$ | $1.350\times10^6$ |
| .040 | $.9040\times10^3$ | $.8150\times10^6$ | .040 | $1.155\times10^3$ | $1.335\times10^6$ |
| .045 | $.9070\times10^3$ | $.8210\times10^6$ | .045 | $1.153\times10^3$ | $1.328\times10^6$ |
| .050 | $.9340\times10^3$ | $.8750\times10^6$ | .050 | $1.149\times10^3$ | $1.322\times10^6$ |
| .055 | $.9420\times10^3$ | $.8870\times10^6$ | .055 | $1.148\times10^3$ | $1.320\times10^6$ |
| .060 | $.9550\times10^3$ | $.9130\times10^6$ | .060 | $1.147\times10^3$ | $1.319\times10^6$ |

*Table IX (see heading N)*

[Percentage of permeance within a given zone for a field-form .280 cm. wide taken as one hundred percent.]

| Zone Width, cm. | .006 Gap | .010 Gap | .020 Gap | .030 Gap | .050 Gap |
|---|---|---|---|---|---|
| 0 | 0 | 0 | 0 | 0 | 0 |
| .2 | 35.2 | 27.2 | 18.9 | 14.8 | 11.6 |
| .4 | 57.7 | 46.6 | 36.1 | 29.8 | 23.0 |
| .6 | 67.0 | 59.7 | 48.8 | 41.4 | 34.1 |
| .8 | 74.8 | 67.5 | 58.8 | 52.1 | 44.3 |
| 1.0 | 79.5 | 73.5 | 66.5 | 60.6 | 53.2 |
| 1.2 | 83.2 | 78.2 | 71.9 | 67.8 | 61.0 |
| 1.4 | 86.5 | 82.3 | 77.6 | 73.8 | 68.0 |
| 1.6 | 89.2 | 85.6 | 82.0 | 79.0 | 74.0 |
| 1.8 | 91.4 | 88.7 | 85.9 | 83.5 | 79.4 |
| 2.0 | 93.4 | 91.2 | 89.3 | 87.2 | 84.3 |
| 2.2 | 95.4 | 93.8 | 92.4 | 90.9 | 88.9 |
| 2.4 | 97.2 | 96.2 | 95.1 | 94.0 | 92.7 |
| 2.6 | 98.6 | 98.4 | 97.5 | 97.0 | 96.1 |
| 2.8 | 100.0 | 100.0 | 100.0 | 100.0 | 100.0 |

*Table X (see heading N)*

[Percentage of force within a given zone for a field-form .280 cm. wide taken as one hundred percent.]

| Zone Width, cm. | .006 Gap | .010 Gap | .020 Gap | .030 Gap | .050 Gap |
|---|---|---|---|---|---|
| 0 | 0 | 0 | 0 | 0 | 0 |
| .2 | 59.6 | 48.2 | 31.9 | 23.0 | 16.2 |
| .4 | 88.7 | 78.0 | 58.0 | 43.6 | 31.5 |
| .6 | 93.2 | 87.5 | 73.8 | 60.2 | 46.5 |
| .8 | 96.3 | 92.0 | 82.7 | 72.1 | 59.0 |
| 1.0 | 97.4 | 94.2 | 87.1 | 80.2 | 67.3 |
| 1.2 | 98.0 | 95.3 | 90.6 | 85.4 | 75.8 |
| 1.4 | 98.5 | 96.8 | 93.0 | 89.2 | 81.5 |
| 1.6 | 98.8 | 97.5 | 94.8 | 91.5 | 86.0 |
| 1.8 | 99.1 | 98.1 | 96.3 | 93.9 | 89.5 |
| 2.0 | 99.3 | 98.5 | 97.0 | 95.7 | 92.6 |
| 2.2 | 99.5 | 98.8 | 98.0 | 97.0 | 95.0 |
| 2.4 | 99.7 | 99.2 | 98.7 | 98.0 | 97.0 |
| 2.6 | 99.9 | 99.7 | 99.3 | 99.0 | 98.3 |
| 2.8 | 100.0 | 100.0 | 100.0 | 100.0 | 100.0 |

*Table XI (see heading P)*

[Value of net stabilizing factor $q$ for a field form .280 cm. wide and a constant flux condition.]

Net stabilizing axial force gradient $=a=kq$.
Net stabilizing radial force gradient $=r=.5\,kq$.

| $g$ | $q$ Derived from Equation 42 | $q$ Corrected for values of $g$ below .005 |
|---|---|---|
| .005 | $-308.0\times10^{-3}$ | .254 |
| .010 | −70.0 | Negative values of $q$ indicate instability. |
| .015 | −20.6 | |
| .020 | −5.82 | |
| .025 | 1.00 | |
| .030 | 3.65 | |
| .035 | 3.63 | |
| .040 | 3.30 | |
| .045 | 2.50 | |
| .050 | 1.81 | |
| .055 | 1.50 | |
| .060 | 1.37 | |

Force gradients are in grams per .001″ of distance.

Values of $q$ have been derived on the assumption that axial and radial gaps have the same constant, $k$. See collected symbols for value of $k$.

*Table XII (see heading D)*

[Percent decrease in pole flux caused by a gap increase from .025″ initial value to .040″ with a saturated section in series.]

| | Silicon Steel | | Nickel Steel | | Mu Metal | |
|---|---|---|---|---|---|---|
| (1) | (2) | (3) | (2) | (3) | (2) | (3) |
| 25 | .120 | 10.10 | .239 | 2.71 | .239 | 3.90 |
| 30 | .156 | 4.40 | .300 | 2.19 | .300 | 2.90 |
| 35 | .200 | 2.70 | .395 | 1.71 | .395 | 2.33 |
| 40 | .244 | 2.00 | .492 | 1.30 | .492 | 1.90 |

Column (1) is the percent of the total available M. M. F. consumed in the saturated sections at the time of the initial .025″ gap length.

Column (2) is the length of the saturated section in cm. sufficient to release 100 gilberts by reason of the percentage flux change in column (3). This saturated section length should be divided equally between the two poles.

Column (3) is the percent decrease in flux, caused by the gap increase.

Table XII is illustrative and typical for a gap increase of .015″ in the range shown. A gap increase of this amount over the range .010″ to .025″ would be somewhat different and would be computed from the induction curves of Fig. 7 and the permeance values of Table I using the same methods as for Table XII.

*Table XIII*

[Values of $z$ for use in lateral force Formulas 14 and 15. Values have been determined by experiment and roughly checked by computation.]

| $g$ | $z$ | $g$ | $z$ | $g$ | $z$ |
|---|---|---|---|---|---|
| .005 | 2.35 | .025 | 2.55 | .045 | 2.75 |
| .010 | 2.40 | .030 | 2.60 | .050 | 2.80 |
| .015 | 2.45 | .035 | 2.65 | .055 | 2.85 |
| .020 | 2.50 | .040 | 2.70 | .060 | 2.90 |

*Table XIV*

[Overall merit factor $m$ as computed from Equation 34.]

| $g$ | $m$ | $g$ | $m$ |
|---|---|---|---|
| .005 | .347 | .035 | 1.547 |
| .010 | .452 | .040 | 1.560 |
| .015 | .625 | .045 | 1.505 |
| .020 | .817 | .050 | 1.495 |
| .025 | 1.110 | .055 | 1.460 |
| .030 | 1.310 | .060 | 1.430 |

COLLECTED SYMBOLS $A$=net axial force$=A_a-A_0-A_r$.

$A_a$=axial force produced by the axial gap.

$A_0$=biasing constant axial force.

$A_r$=axial force produced by the radial gap.

$a$=net or stabilizing axial force gradient. $a=a_r-a_a$.

$a$ as subscript denotes the radial gap.

$a_a$=axial force gradient produced by axial gap.
$a_r$=axial force gradient produced by radial gap.
$B$=symbol for flux density.
$b$=displacement of rotor from neutral position in thousandths of an inch.
$c$=diagonal force between displaced poles (Fig. 9).
$F$=a function, the values of which for different gaps are given in Table II, in which, $$G=H^2F$$

Values of F are picked from the table opposite different figures for $g$. $F_{10}$ would indicate a value of F corresponding to a gap of .010″.

$f$=a function, the values of which for different gaps are given in Table III, in which, $$G=(HP)^2f$$

Values of $f$ are picked out of the table for different values of $g$. $f_{10}$ would indicate a value of $f$ corresponding to a gap of .010″. The value of P in the formula is taken from Table I at the gap value for which the H in the formula is available, namely, a starting or initial gap of reference. This would normally be either the axial gap $a$ or the radial gap $r$.

$G$=force in grams.
$g$=length of any gap expressed in thousandths of an inch. Such gaps are normally annular and have rectangular opposed pole faces.
$g_a$=axial gap length. A magnetic suspension has an axial gap measured between pole faces in a direction parallel to the axis. This, also, is expressed in thousandths of an inch.
$g_r$=radial gap length. A magnetic suspension has a radial gap bounded by two concentric pole faces and is measured in thousandths of an inch along the radius.
$H$=magnetomotive force, M. M. F., in gilberts.
$K_a$=a collection of terms such that $K_aF_a=G_a$ $$K_a=H_a^2L_a$$

$K_r$=a collection of terms such that $K_rF_r=G_r$ $$K_r=H_r^2L_r$$

$k_a$=a collection of terms such that $k_af_a=G_a$ $$k_a=(H_aP_a)^2L_a$$

$k_r$=a collection of terms such that $k_rf_r=G_r$ $$k_r=(H_rP_r)^2L_r$$

$L$=peripheral length of any gap in centimeters.
$L_a$=peripheral length of axial gap in centimeters.
$L_r$=peripheral length of radial gap in centimeters.
$m$=overall factor of merit for stability and is the product of $m_a$ and $m_r$.
$m_a$=axial factor of merit or the ratio between axial push and axial pull gradients (using $f$ and $s$ functions).
$m_r$=radial factor of merit or the ratio between radial centering and decentering force gradients (using $f$ and $s$ functions).
$P$=permeance between two opposed poles per centimeter of pole length. Normally such length would be peripheral length. Values of P for different gap lengths are given in Table I.
$p$=permeance along the path of a single flux line.
$q$=net stabilizing factor (where the gap constants are equal). This is a constant proportional to the net stabilizing force gradient in either the radial or the axial direction. See Equations 37 to 39.
$R_a$=radial force produced by axial gap (centering).
$R_0$=total radial force equal to zero in a centered position.
$R_r$=radial force produced by radial gap (decentering).
$r$=net or stabilizing radial force gradient. $r=r_a-r_r$. $r$ as subscript denotes the radial gap.
$w$=a factor, usually .508, used in determining centering force produced by axial gap. See Equations 16 to 18.
$z$=a factor which when multiplied by the gap length $g$ equals the distance between the action centers of the flux lines in the two poles. See Fig. 9.
$\phi$=symbol for flux
$\theta$=symbol for an angle

We claim:

1. A magnetic suspension unit including an axial pair of annular poles having narrow faces facing one another in the direction of an axis across a short gap and aligned when centered on the axis, a radial pair of annular poles having narrow faces facing one another radially of said axis across a short gap, and permanent magnet means for energizing said poles to force flux through the gap between them; said poles each being saturated along the path of flux rearwardly of the pole from its face and close to its face to maintain flux through the portion of the adjacent gap field directly between the gap faces and near thereto relatively constant in spite of changing gap length, to approach a net stability gradient in both axial and radial directions.

2. A magnetic suspension unit including an axial pair of annular poles having narrow faces facing one another in the direction of an axis across a short gap and aligned when centered on the axis, a radial pair of annular poles having narrow faces facing one another radially of said axis across a short gap, and permanent magnet means for energizing said poles to force flux through the gaps between them; said poles each being saturated along the path of flux rearwardly of the pole from its face and close to its face to maintain flux through the portion of the adjacent gap field directly between the gap faces and near thereto relatively constant in spite of changing gap length, to approach a net stability gradient in both axial and radial directions, and at least one of the radial poles being substantially free from continuous unsaturated paths peripherally of the pole and between the pole face and the saturated portion rearwardly of the pole.

3. A magnetic suspension unit including an axial pair of annular poles having narrow faces facing one another in the direction of an axis across a short gap and aligned when centered on the axis, a radial pair of annular poles having narrow faces facing one another radially of said axis across a short gap, and permanent magnet means for energizing said poles to force flux through the gaps between them; said poles each being saturated along the path of flux rearwardly of the pole from its face and close to its face to maintain flux through the portion of the adjacent gap field directly between the gap faces and near thereto relatively constant in spite of changing gap length, to approach a net stability gradient in both axial and radial directions, and said poles tapering toward said faces to facilitate provision of a substantial depth of saturation.

4. A magnetic suspension unit including an axial pair of annular poles having narrow faces facing one another in the direction of an axis across a short gap and aligned when centered on the axis, a radial pair of annular poles having narrow faces facing one another radially of said axis across a short gap, and permanent magnet means for energizing said poles to force flux through the gaps between them; said poles each being saturated along the path of flux rearwardly of the pole from its face and close to its face to maintain flux through the portion of the adjacent gap field directly between the gap faces and near thereto relatively constant in spite of changing gap length, to approach a net stability gradient in both axial and radial directions, and said poles each tapering toward its said face to facilitate provision of a substantial depth of saturation at least ten times the magnetic width of the pole.

5. A magnetic suspension unit including an axial pair of annular poles having narrow faces facing one another in the direction of an axis across a short gap and aligned when centered on the axis, a radial pair of annular poles having narrow faces facing one another radially of said axis across a short gap, and permanent magnet means for energizing said poles to force flux through the gaps between them; said poles each being saturated along the path of flux rearwardly of the pole from its face and close to its face to maintain flux through the portion of the adjacent gap field directly between the gap faces and near thereto relatively constant in spite of changing gap length, to approach a net stability gradient in both axial and radial directions, each pole face portion, when the pole pairs of which it is a portion are aligned, being separated by at least sixteen times its magnetic pole width from any magnetic material spaced directly laterally thereof.

6. A magnetic suspension unit including a pair of annular poles having narrow faces facing one another across a short gap and aligned in one position, and permanent magnet means for energizing said poles to force flux through the gap between them; said poles each being saturated along the path of flux rearwardly of the pole from its face and close to its face to maintain flux through the portion of the adjacent gap field directly between the gap faces and near thereto relatively constant in spite of changing gap length.

7. A magnetic suspension unit including an axial pair of annular poles having narrow faces facing one another in the direction of an axis across a short gap and aligned when centered on the axis, a radial pair of annular poles having narrow faces facing one another radially of said axis across a short gap, and permanent magnet means for energizing said poles to force flux through the gaps between them, said radial poles each being saturated along the path of flux rearwardly of the pole from its face and close to its face to maintain flux through the portion of the adjacent gap field directly between the gap faces and near thereto relatively constant in spite of changing gap length, to approach a net stability gradient in the radial direction, and at least one of the radial poles being substantially free from continuous unsaturated paths peripherally of the pole and between the pole face and the saturated portion rearwardly of the pole.

8. A magnetic suspension unit including a pair of annular poles having narrow faces facing one another across a short gap and aligned in one position, and permanent magnet means for energizing said poles to force flux through the gap between them; said poles each being saturated along the path of flux rearwardly of the pole from its face and close to its face to maintain flux through the portion of the adjacent gap field directly between the gap faces and near thereto relatively constant in spite of changing gap length, and said pole tapering toward said face to facilitate provision of a substantial depth of saturation.

9. A magnetic suspension unit including a pair of annular poles having narrow faces facing one another across a short gap and aligned in one position, and permanent magnet means for energizing said poles to force flux through the gap between them; said poles each being saturated along the path of flux rearwardly of the pole from its face and close to its face to maintain flux through the portion of the adjacent gap field directly between the gap faces and near thereto relatively constant in spite of changing gap length, and said poles tapering toward said faces to facilitate provision of a substantial depth of saturation at least ten times the magnetic width of the pole.

10. A magnetic suspension unit including an axial pair of annular poles having narrow faces facing one another in the direction of an axis across a short gap and aligned when centered on the axis, a radial pair of annular poles having narrow faces facing one another radially of said axis across a short gap, and permanent magnet means for energizing said poles to force flux through the gap between them; said poles each being saturated along the path of flux rearwardly of the pole from its face and close to its face to maintain flux through the portion of the adjacent gap field directly between the gap faces and near thereto relatively constant in spite of changing gap length, to approach a net stability gradient in both axial and radial directions, and said pole pairs operating with their gap lengths within the range of 2 to 10 times their magnetic pole width.

11. A magnetic suspension unit including an axial pair of annular poles having narrow faces facing one another in the direction of an axis across a short gap and aligned when centered on the axis, a radial pair of annular poles having narrow faces facing one another radially of said axis across a short gap, and permanent magnet means for energizing said poles to force flux through the gap between them; said poles each being saturated along the path of flux rearwardly of the pole from its face and close to its face to maintain flux through the portion of the adjacent gap field directly between the gap faces and near thereto relatively constant in spite of changing gap length, to approach a net stability gradient in both axial and radial directions, and said pole pairs in their neutral positions being substantially equal in length of gap, length of pole, magnetic pole width, and flux density.

12. A magnetic suspension unit including an axial pair of annular poles having narrow faces facing one another in the direction of an axis across a short gap and aligned when centered on the axis, a radial pair of annular poles having narrow faces facing one another radially of said axis across a short gap, and permanent magnet means for energizing said poles to force flux through the gap between them; said poles each being saturated along the path of flux rearwardly of the pole from its face and close to its face to maintain flux through the portion of the adjacent gap field directly between the gap faces and near thereto relatively constant in spite of changing gap length, to approach a net stability gradient in both axial and radial directions, and said pole pairs operating with their gap lengths within the range of 2 to 10 times their magnetic pole width, said pole pairs in their neutral positions being substantially equal in length of gap, length of pole, magnetic pole width, and flux density.

13. A magnetic suspension unit including an axial pair of annular poles having narrow faces facing one another in the direction of an axis across a short gap and aligned when centered on the axis, a radial pair of annular poles having narrow faces facing one another radially of said axis across a short gap, and magnet means for energizing said poles to force flux through the gap between them; said poles each being saturated along the path of flux rearwardly of the pole from its face and close to its face to maintain flux through the portion of the adjacent gap field directly between the gap faces and near thereto relatively constant in spite of changing gap length, to approach a net stability gradient in both axial and radial directions.

14. A magnetic suspension unit including a pair of annular poles having narrow faces facing one another across a short gap and aligned in one position, and magnet means for energizing said poles to force flux through the gap between them; said poles each being saturated along the path of flux rearwardly of the pole from its face and close to its face to maintain flux through the portion of the adjacent gap field directly between the gap faces and near thereto relatively constant in spite of changing gap length, and said poles tapering toward said faces to facilitate provision of a substantial depth of saturation at least ten times the magnetic width of the pole.

15. A magnetic suspension unit including a pair of annular poles facing one another radially across a short gap and aligned in one position, and permanent magnet means for energizing said poles to force flux through the gap between them; at least one of said poles having a narrow face and being saturated along the path of flux rearwardly of the pole from its face and close to its face to maintain flux through the portion of the adjacent gap field directly between the gap faces and near said saturated pole relatively constant in spite of changing gap length, and said pole reducing in cross-section toward said face with dimensions appropriate for supplying approximately a minimum leakage flux consistent with providing a substantial depth of saturation.

16. A magnetic suspension unit including a pair of annular poles facing one another radially across a short gap and aligned in one position, and permanent magnet means for energizing said poles to force flux through the gap between them; at least one of said poles having a narrow face and being saturated along the path of flux rearwardly of the pole from its face and close to its face to maintain flux through the portion of the adjacent gap field directly between the gap faces and near said saturated pole relatively constant in spite of changing gap length, and said pole reducing in cross-section toward said face with dimensions providing a substantial depth of saturation; and a plurality of slots extending rearwardly from said pole face at least far enough back to reach the saturated cross section of the pole.

17. A magnetic suspension unit including a pair of annular poles facing one another radially across a short gap and aligned in one position, and permanent magnet means for energizing said poles to force flux through the gap between them; at least one of said poles having a narrow face and being saturated along the path of flux rearwardly of the pole from its face and close to its face to maintain flux through the portion of the adjacent gap field directly between the gap faces and near said saturated pole relatively constant in spite of changing gap length, and said pole reducing in cross-section toward said face with dimensions providing a substantial depth of saturation; and a plurality of slots extending rearwardly from said pole face.

18. A magnetic suspension unit including a pair of annular poles lying in generally horizontal planes facing one another radially across a short gap, and aligned except for downward displacement of one by gravity, and permanent magnet means for energizing said poles to force flux through the gap between them; the upper of said poles having a nearly horizontal rearwardly extending wall at the bottom edge of its face, and the lower of said poles having a nearly horizontal rearwardly-extending wall at the top edge of its face, at least one of said poles having a narrow face and being saturated along the path of flux rearwardly of the pole from its face and close to its face to maintain flux through the portion of the adjacent gap field directly between the gap faces and near said saturated pole relatively constant in spite of changing gap length, and said pole reducing in cross-section toward said face with dimensions providing a substantial depth of saturation.

19. A magnetic suspension unit according to claim 9 in which the taper of the poles is approximately 8 degrees.

20. A magnetic suspension unit according to claim 9 in which the poles are formed of nickel steel.

21. A magnetic suspension unit according to claim 15 in which the taper of the poles is approximately 8 degrees.

22. A magnetic suspension unit according to claim 15 in which the poles are formed of nickel steel.

References Cited in the file of this patent

UNITED STATES PATENTS

| | | |
|---|---|---|
| 2,333,647 | Green | Nov. 9, 1943 |
| 2,436,939 | Schug | Mar. 2, 1948 |
| 2,585,714 | Wrobel et al. | Feb. 12, 1952 |

FOREIGN PATENTS

| | | |
|---|---|---|
| 3,507 | Great Britain | of 1898 |
| 322,995 | Great Britain | Dec. 16, 1929 |